(12) United States Patent
Arriola et al.

(10) Patent No.: US 9,513,791 B2
(45) Date of Patent: Dec. 6, 2016

(54) ELECTRONIC DEVICE SYSTEM WITH PROCESS CONTINUATION MECHANISM AND METHOD OF OPERATION THEREOF

(75) Inventors: George Arriola, San Francisco, CA (US); Michael P. Bauerly, San Francisco, CA (US); Brian W. Johnson, San Francisco, CA (US); Reiko Miyazaki, Tokyo (JP); Tatsushi Nashida, Tokyo (JP); Ken Miyashita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1122 days.

(21) Appl. No.: 13/077,972

(22) Filed: Mar. 31, 2011

(65) Prior Publication Data

US 2012/0079420 A1 Mar. 29, 2012

Related U.S. Application Data

(60) Provisional application No. 61/404,274, filed on Sep. 29, 2010.

(51) Int. Cl.
*G06F 3/048* (2013.01)
*G06F 3/033* (2013.01)
(Continued)

(52) U.S. Cl.
CPC .......... *G06F 3/0485* (2013.01); *G06F 3/0482* (2013.01); *G06F 3/0486* (2013.01);
(Continued)

(58) Field of Classification Search
CPC .. G06F 3/0485; G06F 3/04855; G06F 3/0481; G09G 5/14; G09G 5/34
(Continued)

(56) References Cited

U.S. PATENT DOCUMENTS 5,757,368 A 5/1998 Gerpheide et al.
6,011,553 A 1/2000 Komiyama
(Continued)

FOREIGN PATENT DOCUMENTS

CN 1770085 A 5/2006
JP 11353106 12/1999
(Continued)

OTHER PUBLICATIONS

Office Action and Search Report for CN Application No. 201110259719.3 dated Feb. 7, 2013.
(Continued)

*Primary Examiner* — Doon Chow
*Assistant Examiner* — Shourjo Dasgupta
(74) *Attorney, Agent, or Firm* — Haverstock & Owens LLP

(57) ABSTRACT

A method of operation of an electronic device system includes: detecting a drag performed on a touch screen, the drag having a starting point and an ending point; detecting a stretchable cursor extendable based on the drag, the stretchable cursor having a cursor length, a cursor direction, a starting portion, and an ending portion at the ending point and larger than the starting portion at the starting point; displaying the stretchable cursor on the touch screen; and performing a process routine based on the cursor length and the cursor direction, the process routine continued after the stretchable cursor is pasted with the drag performed on the touch screen.

20 Claims, 22 Drawing Sheets

(51) Int. Cl.

| | | |
|---|---|---|
| *G06F 3/041* | (2006.01) | |
| *G09G 5/00* | (2006.01) | |
| *G06F 3/0485* | (2013.01) | |
| *G06F 3/0482* | (2013.01) | |
| *G06F 3/0484* | (2013.01) | |
| *G06F 3/0486* | (2013.01) | |
| *G06F 3/0488* | (2013.01) | |
| *G06F 3/0481* | (2013.01) | |

(52) U.S. Cl.
 CPC ...... *G06F 3/04812* (2013.01); *G06F 3/04847* (2013.01); *G06F 3/04883* (2013.01); *G06F 2203/04801* (2013.01)

(58) Field of Classification Search
 USPC .......................................................... 715/784
 See application file for complete search history.

(56) References Cited

U.S. PATENT DOCUMENTS

| | | | |
|---|---|---|---|
| 6,473,069 | B1 | 10/2002 | Gerpheide |
| 7,681,142 | B2 | 3/2010 | Jarrett et al. |
| 2006/0048071 | A1 | 3/2006 | Jarrett et al. |
| 2007/0273664 | A1 | 11/2007 | Kim et al. |
| 2008/0134078 | A1 | 6/2008 | Han |
| 2008/0222559 | A1* | 9/2008 | Kim ................................ 715/785 |
| 2008/0234849 | A1* | 9/2008 | Han ..................... G11B 27/105 700/94 |
| 2009/0002324 | A1 | 1/2009 | Harbeson et al. |
| 2009/0058830 | A1 | 3/2009 | Herz et al. |
| 2009/0153288 | A1* | 6/2009 | Hope et al. ..................... 340/3.1 |
| 2009/0213086 | A1* | 8/2009 | Chae et al. ..................... 345/173 |
| 2009/0228842 | A1* | 9/2009 | Westerman et al. .......... 715/863 |
| 2009/0237421 | A1* | 9/2009 | Kim et al. ..................... 345/661 |
| 2010/0188352 | A1* | 7/2010 | Ikeda ............................ 345/173 |
| 2010/0241976 | A1 | 9/2010 | Nozaki et al. |
| 2011/0154196 | A1 | 6/2011 | Icho et al. |
| 2011/0265039 | A1* | 10/2011 | Lyon et al. .................... 715/830 |
| 2012/0154330 | A1* | 6/2012 | Shimizu .................. G06F 3/016 345/174 |

FOREIGN PATENT DOCUMENTS

| | | |
|---|---|---|
| JP | 2010002404 | 1/2010 |
| WO | 2010087203 A1 | 8/2010 |

OTHER PUBLICATIONS

European Search Report from EP Application No. 11178742.0 dated Feb. 18, 2015.

* cited by examiner

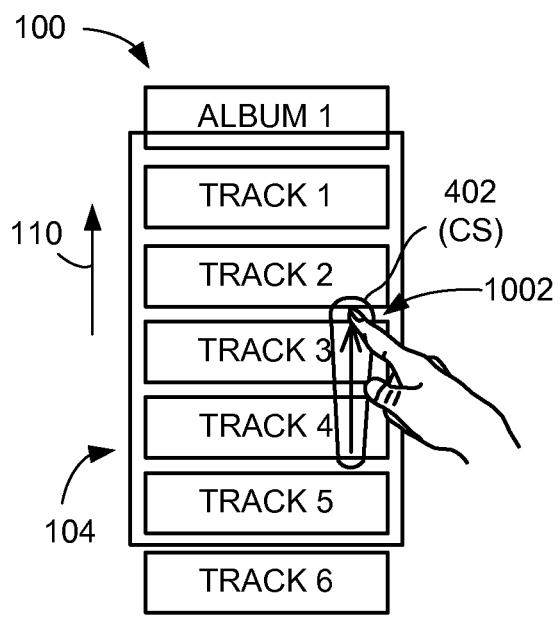
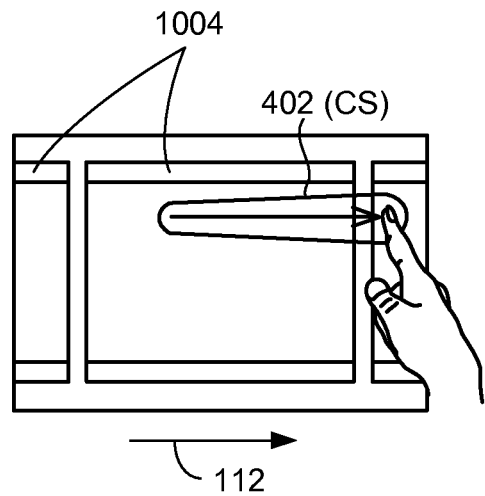
FIG. 10A
FIG. 10B
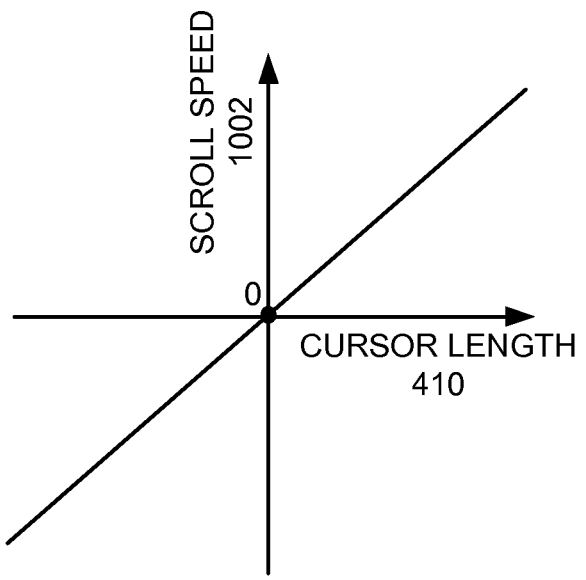
FIG. 10C

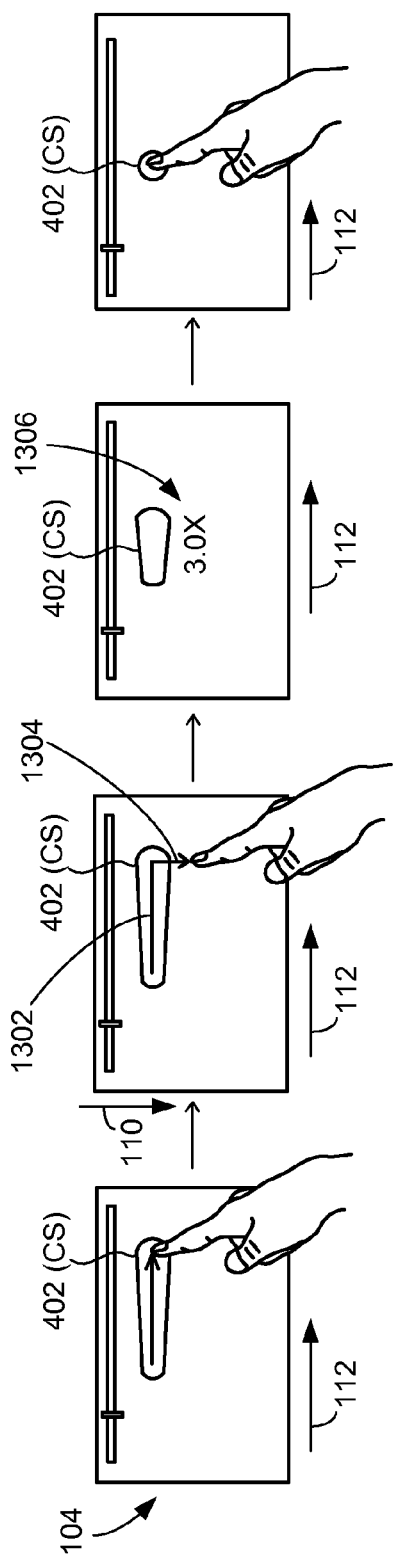

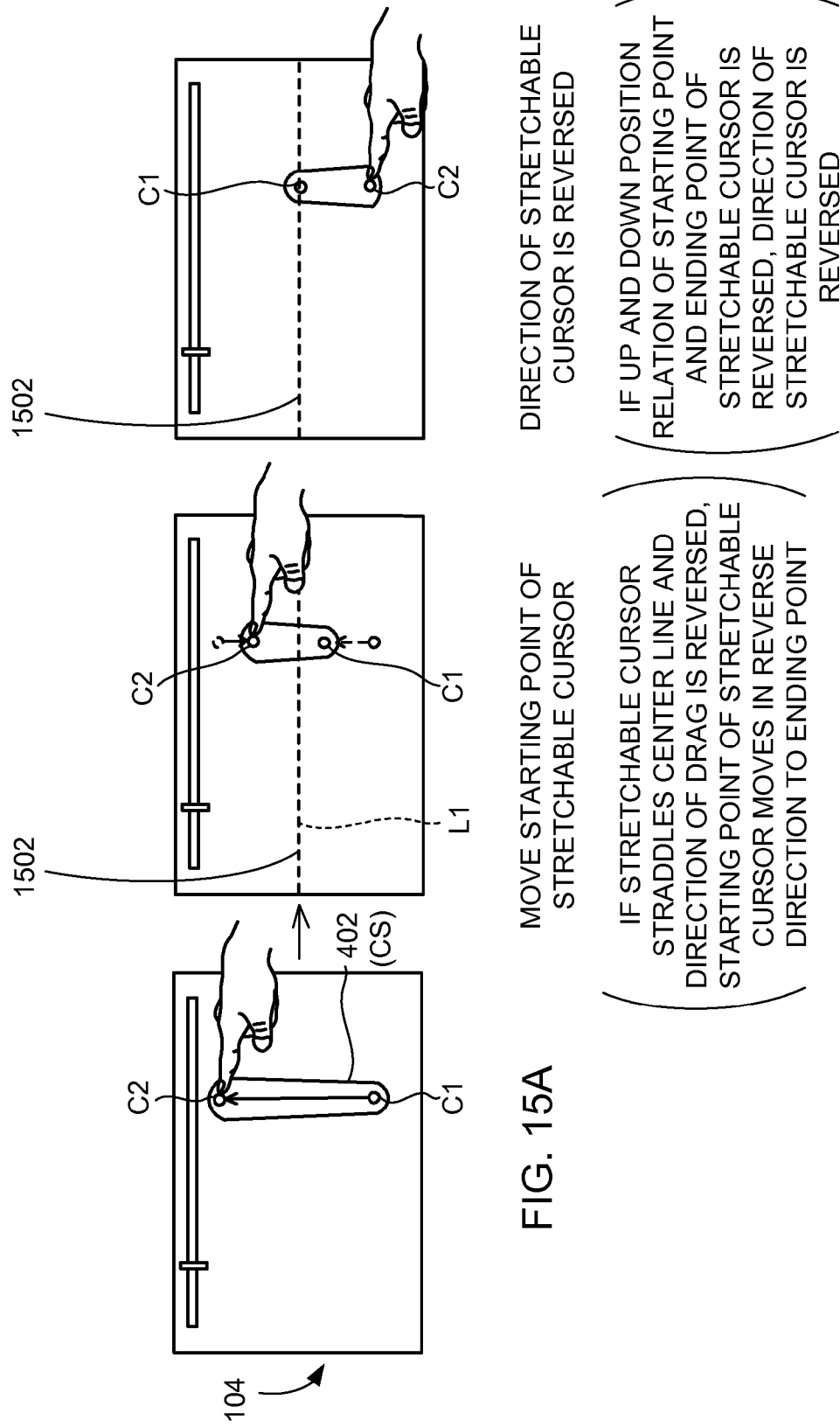

ELECTRONIC DEVICE SYSTEM WITH PROCESS CONTINUATION MECHANISM AND METHOD OF OPERATION THEREOF

CROSS-REFERENCE TO RELATED APPLICATION(S)

This application claims the benefit of U.S. Provisional Patent Application Ser. No. 61/404,274 filed Sep. 29, 2010 and the subject matter thereof is incorporated herein by reference thereto.

TECHNICAL FIELD

The present invention relates generally to a display system, and more particularly to a system for process continuation for information processing.

BACKGROUND ART

This relates to electronic devices and, more particularly, to touch sensitive displays for electronic devices. Electronic devices such as cellular telephones, handheld computers, and portable music players often include displays. A display includes an array of controllable pixels that are used to present visual information to a user. It is often desirable to provide displays with touch sensor capabilities. For example, personal digital assistants have been provided with touch screens using resistive touch sensing technology. When a finger of a user or other external object is brought into the vicinity of the touch sensor, corresponding changes to the screen can be sensed and converted into touch location information.

Recently, there has been widespread an information processing apparatus having a variety of manipulation devices. For example, in an information processing apparatus having a touch screen, an intuitive manipulation can be performed by a touch manipulation (touch (contact), tap (touch and then release), drag (trace), flick (flip), or the like) on a screen.

The use of touch sensitive surfaces as input devices for computers and other electronic devices has increased significantly in recent years. It would therefore be desirable to be able to provide improved usability, reliability, and accuracy of touch sensitive screens for electronic devices.

Thus, a need still remains for a display system with a process continuation mechanism to provide benefits of minimized costs and to maximize efficiency while improving reliability, safety, or handling of the people or merchandise. In view of the ever increasing social and economic transportation needs of the world, it is increasingly critical that answers be found to these problems.

In view of growing consumer expectations, an improved system for movement of people or goods in a timely manner are highly sought after, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of an electronic device system including: detecting a drag performed on a touch screen, the drag having a starting point and an ending point; detecting a stretchable cursor extendable based on the drag, the stretchable cursor having a cursor length, a cursor direction, a starting portion, and an ending portion at the ending point and larger than the starting portion at the starting point; displaying the stretchable cursor on the touch screen; and performing a process routine based on the cursor length and the cursor direction, the process routine continued after the stretchable cursor is pasted with the drag performed on the touch screen.

The present invention provides an electronic device system, including: a manipulation module for detecting a drag performed on a touch screen, the drag having a starting point and an ending point; a control module, coupled to the manipulation module, for detecting a stretchable cursor extendable based on the drag, the stretchable cursor having a cursor length, a cursor direction, a starting portion, and an ending portion at the ending point and larger than the starting portion at the starting point; a display module, coupled to the control module, for displaying the stretchable cursor on the touch screen; and a first set reproduction module, coupled to the display module, for performing a process routine based on the cursor length and the cursor direction, the process routine continued after the stretchable cursor is pasted with the drag performed on the touch screen.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

FIGS. 10A to 10C are diagrams schematically illustrating a control of the scroll speed.

FIGS. 13A to 13D are diagrams schematically illustrating a first manipulation input example through the stretchable cursor in a moving image reproduction application.

FIGS. 15A to 15C are diagrams schematically illustrating a third manipulation input example through a stretchable cursor in a moving image reproduction application.

BEST MODE FOR CARRYING OUT THE INVENTION

Figure 1:
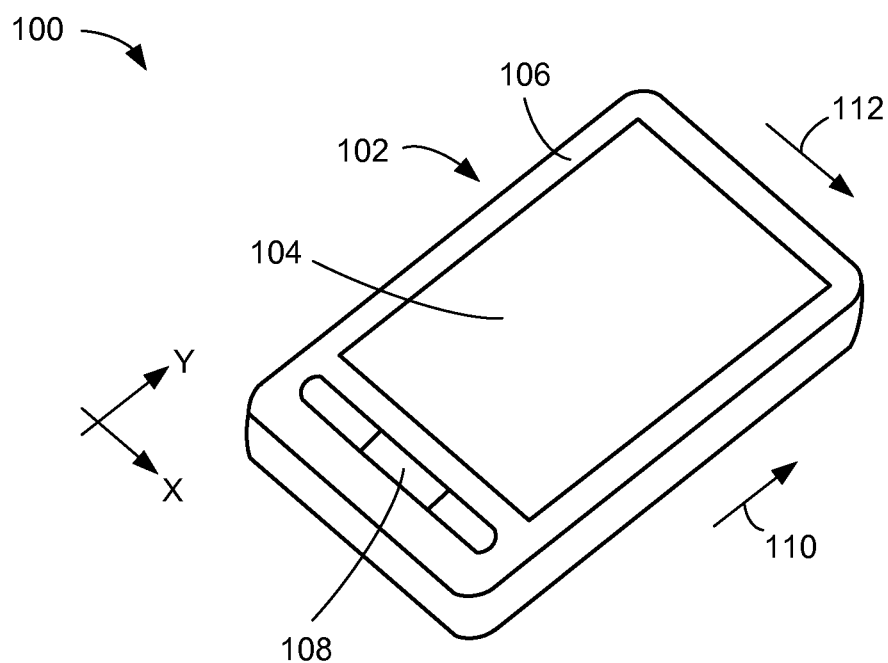
FIG. 1 is an electronic device system with a process continuation mechanism in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a micro electro mechanical system (MEMS), passive devices, or a combination thereof.

The term "set" refers to assign, generate, determine, calculate, evaluate, any other method, or a combination thereof. For example, a display speed of a multimedia output can be set by assigning a nominal speed value to the display speed.

In a navigation apparatus, since the reduced scale of the map is changed with the drag, for example, if a desired scale is not obtained with one drag, the drag should be repeated several times to continuously enlarge or reduce the map until the desired scale is obtained. In an information processing apparatus, the drag should be performed several times in some cases, which may deteriorate manipulability. Embodiments of the present invention provide an information processing apparatus, a process continuing method, and a process continuing program in which manipulability is enhanced after a manipulation input is performed with a drag.

Referring now to FIG. 1, therein is shown an electronic device system 100 with a process continuation mechanism in a first embodiment of the present invention. FIG. 1 is an exemplary diagram schematically illustrating an external configuration of a mobile terminal. For example, the electronic device system 100 can include a mobile terminal.

The electronic device system 100 is shown as a mobile device as an example, although it is understood that the electronic device system 100 can be implemented in different form factors or configurations. For example, the electronic device system 100 can be a stationary computing device with a touch screen, such as a desktop computer or an interactive monitor or display.

The electronic device system 100 can be related to an information processing apparatus, a process continuing method, and a process continuing program. For example, the electronic device system 100 can be appropriate for an information processing apparatus, which is capable of performing a manipulation input with a drag as an intuitive manipulation.

The electronic device system 100 can include a casing 102 having an approximately flat shape and a size, which can be gripped with one hand. The electronic device system 100 can include a touch screen 104. The touch screen 104 provides an interface to the user of the electronic device system 100 for providing a screen display output from the electronic device system 100 as well as an input interface from contact to the screen into the electronic device system 100.

The touch screen 104 can be installed in a central section of a front surface 106 of the casing 102. For illustrative purposes, the casing 102 and the touch screen 104 are shown in a rectangular shape, although it is understood that the casing 102 and the touch screen 104 can include any other shapes.

Examples of the touch screen 104 can include a liquid crystal display panel, and a thin and transparent touch panel, which covers a display surface of the liquid crystal display panel. The touch panel is of an electrostatic capacitance type, for example. The electronic device system 100 can receive a touch manipulation using a finger, a touch pen, or a stylus on the touch screen 104 as a manipulation input of a user (not shown).

The electronic device system 100 can include a non-screen interface 108. The non-screen interface 108 is an input interface that is different from the touch screen 104. The non-screen interface 108 can be a button, a keyboard interface, a track ball, arrow buttons, a touch pad, or a combination thereof.

The electronic device system 100 can be used in any direction. The electronic device system 100 can be used in a longitudinal direction 110 or a transverse direction 112, which points in a direction that is vertically or horizontally, respectively, with respect to a side of the touch screen 104 based on an orientation of the touch screen 104.

For example, when the orientation of the touch screen 104 is positioned such that a shorter side of the touch screen 104 is along the horizontal direction and a longer side of the touch screen 104 is along the vertical direction, the longitudinal direction 110 and the transverse direction 112 are along the longer side and the shorter side, respectively. In other words, the longitudinal direction 110 and the transverse direction 112 are perpendicular to the shorter side and the longer side, respectively. In this case, the touch screen 104 is longitudinally long.

Also for example, when the orientation of the touch screen 104 is positioned such that a shorter side of the touch screen 104 is along the vertical direction and a longer side of the touch screen 104 is along the horizontal direction, the longitudinal direction 110 and the transverse direction 112 are along the shorter side and the longer side, respectively. In other words, the longitudinal direction 110 and the transverse direction 112 are perpendicular to the longer side and the shorter side, respectively. In this case, the touch screen 104 is transversely long.

As an example, FIG. 1 depicts an X-axis and a Y-axis that are lines in a plane of the touch screen 104 along the shorter side and the longer side of the touch screen 104, respectively. For illustrative purposes, the longitudinal direction 110 and the transverse direction 112 are shown along the Y-axis and the X-axis, respectively, although it is understood that the longitudinal direction 110 and the transverse direction 112 can be along the X-axis or the Y-axis, respectively, depending on the orientation of the touch screen 104.

Figure 2:
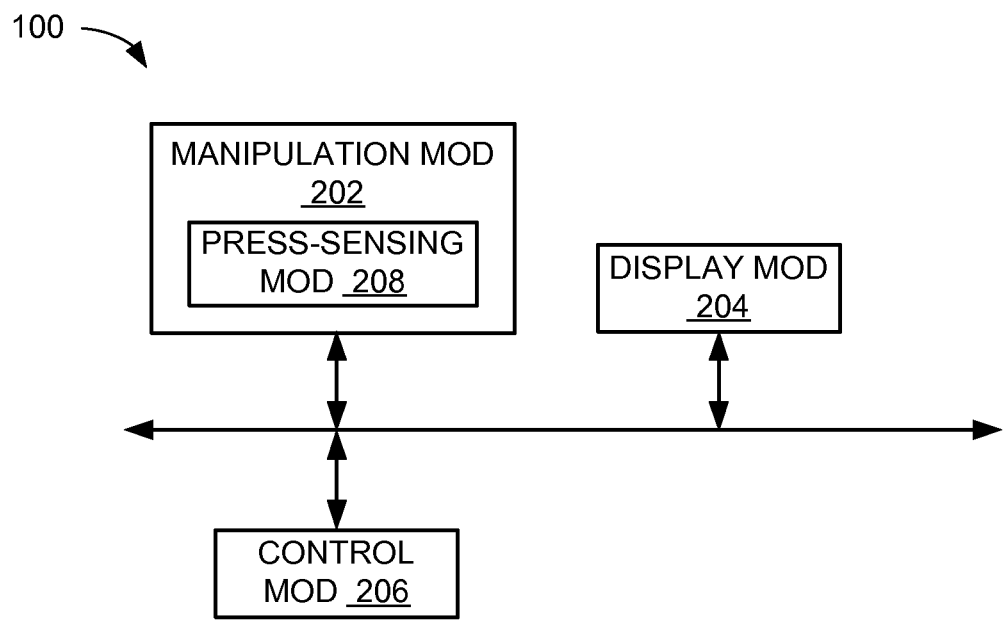
FIG. 2 is an exemplary functional block diagram of the electronic device system.

Referring now to FIG. 2, therein is shown an exemplary functional block diagram of the electronic device system 100. The exemplary functional block diagram represents a functional configuration of an information processing apparatus of the electronic device system 100. The electronic device system 100 can include a manipulation module 202, a display module 204, and a control module 206.

The control module 206 provides control of operation and data flow to and between the modules depicted in FIG. 2. The control module 206 can display on the display module 204 a cursor connecting a starting point and an ending point of a drag based on the drag, if the drag is performed through the manipulation module 202. The control module 206 can perform a process based on the length of the cursor.

The manipulation module 202 recognizes and processes the interaction to the touch screen 104 of FIG. 1 through the display module 204. The display module 204 provides the interface and recognition of the interaction to the touch screen 104. The display module 204 can be implemented with the touch screen 104.

While the control module 206 performs the processing based on the length of the cursor displayed based on the drag, if there is a paste manipulation for pasting the cursor on a screen of the display module 204 through the manipulation module 202, the control module 206 can automatically continue to perform the process thereafter. In this way, after the paste manipulation, the control module 206 can continue to perform the process, which has been performed by the drag, without performing the drag.

As an example, in a case where the control module 206 performs a process for increasing or decreasing an arbitrary parameter based on the drag, it is possible to continue to increase or decrease the parameter without performing the drag, after the paste manipulation. The parameter can be a portion of the display on the touch screen 104.

Further, when a direction from one end portion of the cursor which becomes a starting point side of the drag toward the other end portion of the cursor which becomes an ending point side of the drag is referred to as the direction of the cursor, the control module 206 can perform a process based on the direction and length of the cursor. As a specific example, if a manipulation for bending the direction of the cursor at a right angle is performed in a state where the cursor is displayed on the display module 204 based on the drag, the control module 206 can continue to perform the process thereafter, using the manipulation as the paste manipulation.

The control module 206 can perform a process of reproducing contents at a reproduction speed based on the direction and length of the cursor. In this example, the control module 206 can display the cursor on the display module 204 based on the drag, and if the paste manipulation is performed while the contents are reproduced at the reproduction speed based on the direction and length of the cursor, the control module 206 can continue to reproduce the contents at the reproduction speed. The reproduction speed is a rate at which multimedia or other communication messages or displays are generated and to be displayed or output. For example, the reproduction speed can represent a speed at which a moving image is displayed on a display screen.

The control module 206 can perform a process of scrolling a display object displayed on the display module 204 at a scroll speed based on the direction and length of the cursor. In this example, the control module 206 can display the cursor on the display module 204 based on the drag, and if the paste manipulation is performed while the display object is scrolled at the scroll speed based on the direction and length of the cursor, the control module 206 can continue to scroll the display object at the scroll speed. The scroll speed is a movement rate at which multimedia information that is panned across, displayed, or output with the display module 204.

The control module 206 can also perform a process of increasing or decreasing a predetermined parameter at an increasing or decreasing speed based on the direction and length of the cursor. In this example, the control module 206 can display the cursor on the display module 204 based on the drag, and if the paste manipulation is performed while the parameter is increased or decreased at the increasing or decreasing speed based on the direction and length of the cursor, the control module 206 can continue to increase or decrease the parameter at the increasing or decreasing speed.

The parameter is a control function that is displayed by the display module 204 for a user to adjust or manipulate generation of multimedia data that is currently displayed or to be displayed. For example, the parameter can be displayed as a menu or control bar for a sound volume or speed adjustment.

The manipulation module 202 can include a press-sensing module 208 for sensing a press manipulation on a manipulation surface of the manipulation module 202. If the control module 206 recognizes that the press manipulation is performed based on the sensing result of the press-sensing module 208, the control module 206 can continue to perform the process thereafter, using the press manipulation as the paste manipulation.

If the paste manipulation is performed, the control module 206 can continue to perform the process and display information indicating contents of the process on the display module 204. If a predetermined manipulation is performed while the control module 206 continues to perform the process, the control module 206 can terminate the process. The predetermined manipulation is an operation of controlling the cursor that is preconfigured for ease of use, occurs prior to the control module 206 terminates from its current execution, or a combination thereof.

It has been discovered that the manipulability is further enhanced with the control module 206 continues to perform any process without having the user performing the drag several times.

Figure 3:
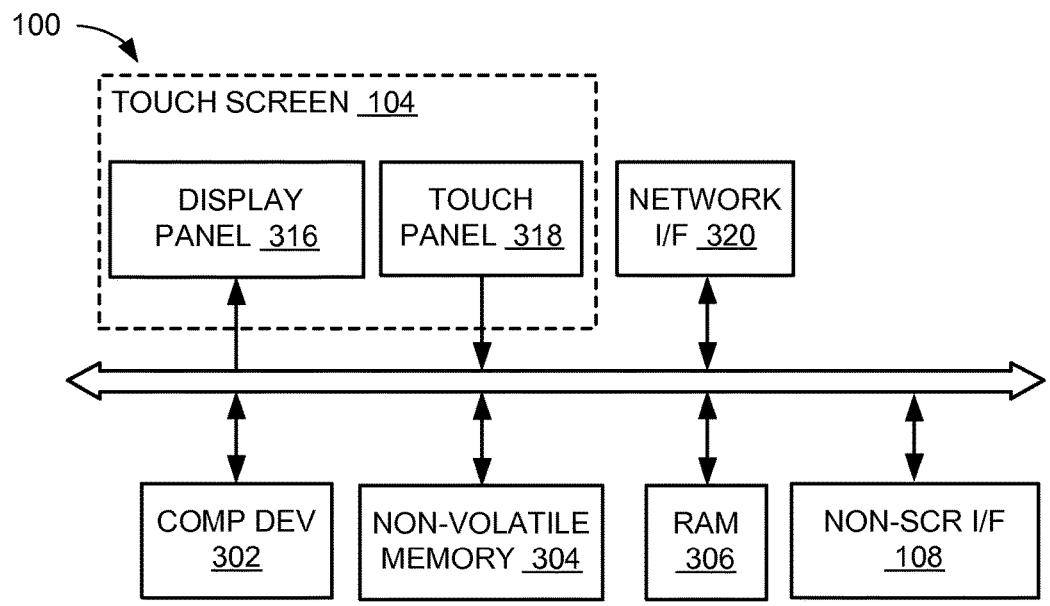
FIG. 3 is an exemplary hardware block diagram of the electronic device system.

Referring now to FIG. 3, therein is shown an exemplary hardware block diagram of the electronic device system 100. FIG. 3 is a specific example of the electronic device system 100 or more specifically of the functional block diagram shown in FIG. 2. For example, FIG. 3 is a block diagram illustrating a hardware configuration of a mobile terminal.

The electronic device system 100 can include a computing device 302. The computing device 302 provides the computation function for the electronic device system 100. Examples of the computing device 302 are a central processing unit (CPU), a microprocessor, a microcontroller, an application specific integrated circuit, an applicant specific standard product, or a hardware state machine.

The computing device 302 can store and execute a program stored in or from a non-volatile memory 304, a random access memory 306, or a combination thereof. The computing device 302 can expand the program, which can be stored in the non-volatile memory 304, in the random access memory 306 and read the program from the random access memory 306. The non-volatile memory 304 is a memory device or a portion of a device that retains the stored contents without power supplied to the non-volatile memory 304. The computing device 302 can perform a variety of processes based on the program, and controls the respective modules in FIG. 2 and hardware blocks in FIG. 3.

The touch screen 104 can include a display panel 316, which is a display device that displays a variety of information, and a touch panel 318, which is a manipulation input device that receives a manipulation input. For example, the display panel 316 can represent a liquid crystal display.

If any position on the touch panel 318 is touched by a finger, the touch panel 318 can detect the coordinates of a position touched (that is, touch position). The touch panel 318 can transmit an input signal indicating the coordinates of the touch position to the computing device 302. The touch panel 318 can transmit an input signal indicating the coordinates of the touch position to the computing device 302 at a predetermined time interval, for example, at the time of a drag, during a continuous touch, or the like.

If the computing device 302 obtains the coordinates of the touch position from the input signal transmitted from the touch panel 318, the computing device 302 can convert the coordinates into screen coordinates of the display panel 316, to recognize which position on the screen of the display panel 316 is touched. That is, the computing device 302 can recognize the touch position on the screen. The computing device 302 can sequentially convert the coordinates of the touch position obtained from the input signal transmitted at a predetermined time interval to the screen coordinates of the display panel 316, to recognize how the touch position is moved that is, a trace of the touch position.

The computing device 302 can specify how the touch manipulation is performed on the screen based on the touch position and the trace recognized in this way. The computing device 302 can process the touch manipulation received as the manipulation input and can perform a process based on the manipulation input.

The computing device 302 can also receive the touch manipulation, such as a touch, tap, drag, flick, or similar gesture like action as the manipulation input. The computing device 302 can recognize a press manipulation for the non-screen interface 108, receive the press manipulation as a manipulation input by a user, and perform a process based on the manipulation input.

Here, for example, in a state where thumbnails of images (not shown) stored as image files in the non-volatile memory 304 is list-displayed, a user can tap a desired thumbnail in the touch screen 104 as a selection input. The computing device 302 can receive the touch manipulation as the manipulation input for reproducing images and read out an image file corresponding to the tapped thumbnail from the non-volatile memory 304, the random access memory 306, or a combination thereof.

In this example, the corresponding image file is a still image file and the computing device 302 can extract still image data from the still image file. The computing device 302 can perform predetermined reproduction processes with respect to the still image data to obtain a still image signal and display it on the display panel 316 of the touch screen 104. For example, the predetermined reproduction processes can include a decoding process, a digital analog conversion process, and the like.

In a different example, the corresponding image file is a moving image file and the computing device 302 can separate moving image data and sound data from the moving image file. The computing device 302 can perform predetermined reproduction processes with respect to the moving image data to obtain a moving image signal and display it on the display panel 316 of the touch screen 104. For example, the predetermined reproduction processes can include a decoding process, a digital analog conversion process, and the like.

The computing device 302 can perform other predetermined reproduction processes with respect to the sound data to obtain a sound image signal and output it through a headphone terminal (not shown). For example, the predetermined reproduction processes can include a decoding process, a digital analog conversion process, an amplifying process, and the like.

The electronic device system 100 can reproduce an image designated by the user. Further, for example, in a state where a music title (track) stored as a music file in the non-volatile memory 304 is list-displayed on the touch screen 104, it can be assumed that the user taps a desired title.

The electronic device system 100 can reproduce music designated by the user. The computing device 302 can receive the touch manipulation as a manipulation input for reproducing the music and read out a music file corresponding to the tapped title from the non-volatile memory 304. The computing device 302 can extract sound data from the music file.

The computing device 302 can perform predetermined reproduction processes with respect to the sound data to obtain a sound signal and output it through a headphone terminal (not shown). For example, the predetermined reproduction processes can include a decoding process, a digital analog conversion process, an amplifying process, and the like.

The electronic device system 100 can reproduce the music designated by the user and display information about the music. The computing device 302 can extract information from the read out music file and display it on the display panel 316 of the touch screen 104. For example, the information extracted can include a jacket image, a title of the track, a title of an album, or an artist name.

Further, for example, in a state where an icon corresponding to an operation of a Web browser is displayed on the touch screen 104, it can be assumed that the user taps the icon. The computing device 302 can receive the touch manipulation as a manipulation input for operating the Web browser and read out a program of the Web browser from the non-volatile memory 304, the random access memory 306, or a combination thereof to be executed and to operate the Web browser.

The electronic device system 100 can display the Web page by operating the Web browser. The computing device 302 can display a screen of the Web browser on the display panel 316 of the touch screen 104 and can receive page data on a Web page from a server, which can be on a network through a network interface 320. The computing device 302 can display a page image based on the page data on the screen of the Web browser.

The electronic device system 100 can be installed with a user interface capable of performing a variety of manipulation inputs with only drag, which is a type of touch manipulation. As a specific example, in the electronic device system 100, information about positions of a starting point and an ending point of a drag, a direction from the starting point toward the ending point, the distance from the starting point to the ending point, or the like (hereinafter, referred to as drag information), and a variety of manipulation inputs correspond to each other, in advance with predetermined configurations.

The electronic device system 100 can perform a variety of manipulation inputs by changing the starting point and ending point positions, the starting point and ending point direction, the starting point and ending point distance or the like, using only the drag. For example, the starting point of the drag is a touch position or an initial touch position when the drag is started. The ending point of the drag is a current touch position after the drag is started. During the drag, the starting point is fixed and the ending point moves based on movement of a finger.

The positions of the starting point and the ending point of the drag are starting point and ending point positions, respectively. The direction from the starting point of the drag to the ending point is a starting point and ending point direction. The distance from the starting point of the drag to the ending point is a starting point and ending point distance.

If the drag is actually performed, the computing device 302 can obtain drag information about starting point and ending point positions, a starting point and ending point direction, a starting point and ending point distance, or the like from the drag, to receive a manipulation input corresponding to the drag information. However, in order to obtain a desirable manipulability with such a user interface, it is preferable that the user can easily recognize the starting point and ending point positions, the starting point and ending point direction, the starting point and ending point distance, or the like of the drag.

Figure 4:
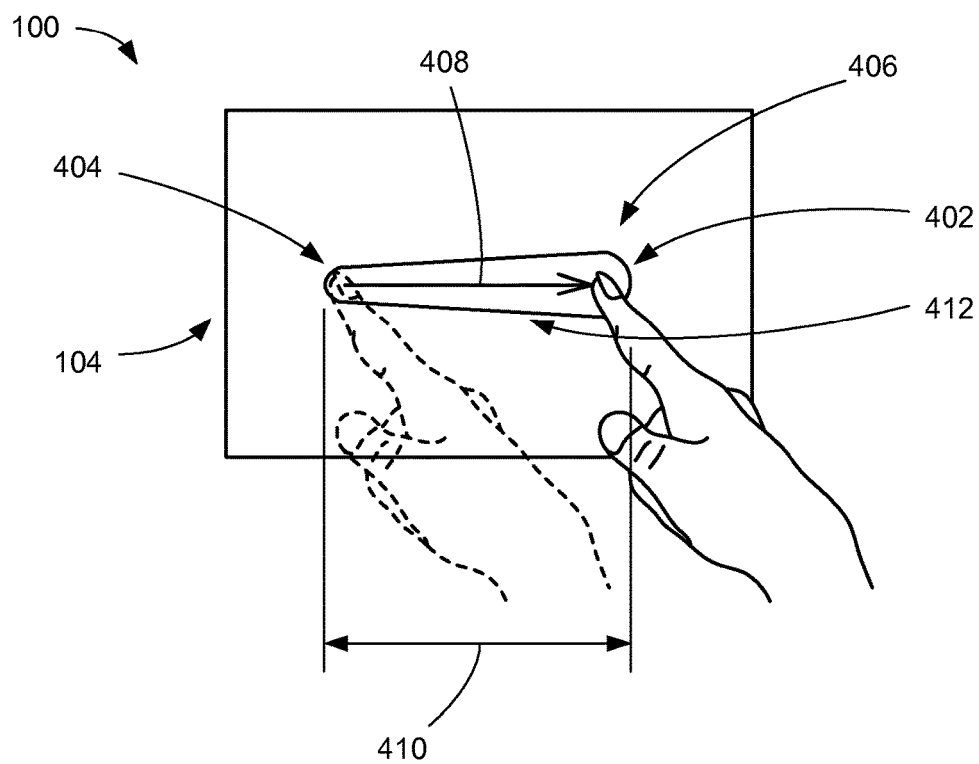
FIG. 4 is an example of an operation of the electronic device system for a stretchable cursor.

Referring now to FIG. 4, therein is shown an example of an operation of the electronic device system 100 for a stretchable cursor 402. FIG. 4 is an example of a diagram schematically illustrating a display of the stretchable cursor 402.

The electronic device system 100 can display the stretchable cursor 402 visually indicating positions of a starting point 404 and an ending point 406. The stretchable cursor 402 can be displayed with a cursor direction 408 that represents a direction from the starting point 404 to the ending point 406, and a cursor length 410 that represents a distance between extents of the stretchable cursor 402 on the touch screen 104 when the drag is performed. The starting point 404 and the ending point 406 can represent the starting and ending points previously described in the figures above.

The stretchable cursor 402 can be created when a drag 412 is performed. The drag 412 is a trace created by an operation performed on the touch screen 104. The drag 412 can represent the drag previously described in FIGS. 1-3 above.

The stretchable cursor 402 stretches from the starting point 404 of the drag 412 to the ending point 406. The cursor direction 408 (stretching direction) or the cursor length 410 (stretchable cursor length) can be changed based on the movement and location of the ending point of the drag 412, to follow the drag 412. The stretchable cursor 402 can be extendable based on the drag 412 along the touch screen 104.

By displaying the stretchable cursor 402, the electronic device system 100 can allow the user to easily recognize positions of the starting point 404 and the ending point 406, the cursor direction 408, and the cursor length 410 of the drag 412. The stretchable cursor 402 and the manipulation input through the stretchable cursor 402 will be described in more detail hereinafter.

As a specific hardware or functional example, the manipulation module 202 of FIG. 2 is the touch panel 318 of FIG. 3. The display module 204 of FIG. 2 is the display panel 316 of FIG. 3 of the electronic device system 100. The control module 206 of FIG. 2 is the computing device 302 of FIG. 3 of the electronic device system 100.

It has been discovered that the stretchable cursor 402 extendable based on the drag 412 with the control module 206 allows the user to easily manipulate a desired input by the touch panel 318.

Figure 5A:
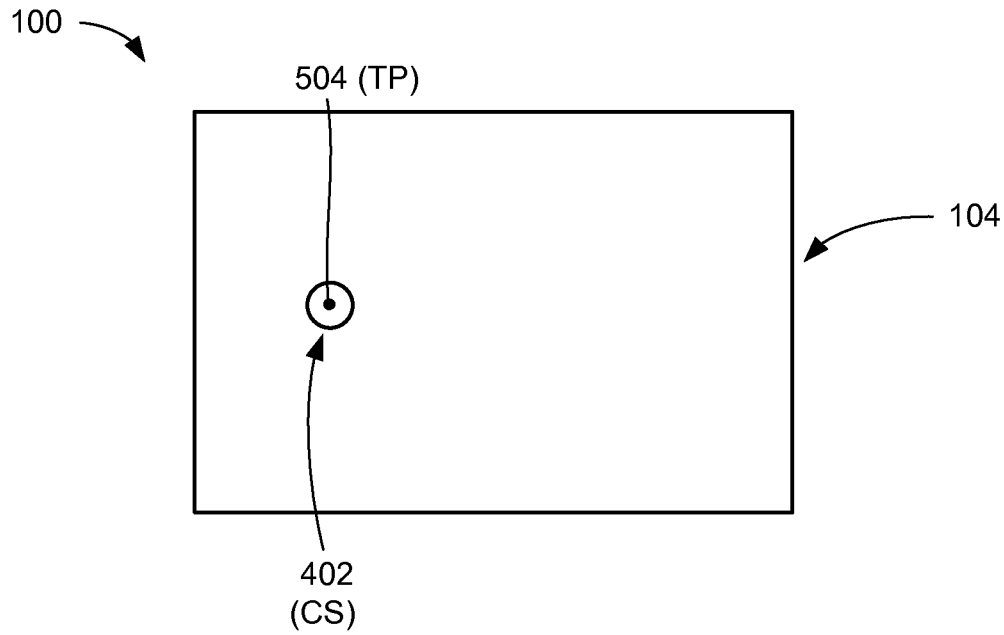
FIGS. 5A and 5B are diagrams schematically illustrating an exemplary shape of the stretchable cursor.
Figure 5B:
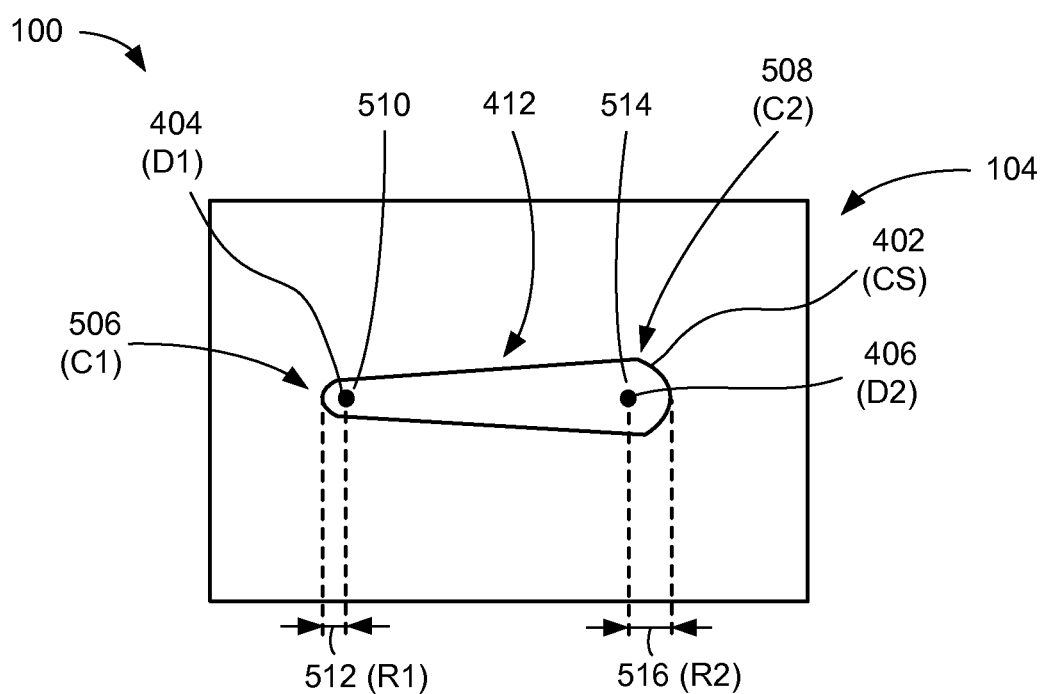

Referring now to FIGS. 5A and 5B, therein are shown diagrams schematically illustrating an exemplary shape of the stretchable cursor 402 (CS). The diagrams depict a manipulation input with extendable cursor. In a basic operation, if a finger of a user touches the touch screen 104, as shown in FIG. 5A, the computing device 302 of FIG. 3 can display a stretchable circular cursor, depicted as the stretchable cursor 402, around a touch position 504 (TP) on the touch screen 104. The touch position 504 can represent the touch position previously described in the figures above.

Then, if the drag 412 is performed in a state where the finger of the user is not disengaged, as shown in FIG. 5B, the computing device 302 can stretch the stretchable cursor 402 from the starting point 404 (D1) of the drag 412 to the ending point 406 (D2) thereof. The starting point 404 (D1) and the ending point 406 (D2) can be at initial and current positions of the touch position 504, respectively. Thus, the electronic device system 100 can allow the user to recognize that the touch manipulation is received as the drag 412, and perform the drag 412 with such a touching as to directly contact and extend the stretchable cursor 402.

Further, as the stretchable cursor 402 stretches from the starting point 404 of the drag 412 to the ending point 406 thereof in this way, the electronic device system 100 can allow the user to recognize the distance from the starting point 404 of the drag 412 to the ending point 406 thereof (starting point and ending point distance).

Hereinafter, a position corresponding to or at the starting point 404 (D1) of the drag 412 in the stretchable cursor 402 is denoted as a starting position 506 (C1) of the stretchable cursor 402, and a position corresponding to or at the ending point 406 (D2) of the drag 412 is denoted as an ending position 508 (C2) of the stretchable cursor 402. That is, the stretchable cursor 402 can stretch from the starting position 506 (C1) corresponding to the starting point 404 (D1) of the drag 412 to the ending position 508 (C2) corresponding to the ending point 406 (D2) of the drag 412.

Further, the stretchable cursor 402 can be formed in a shape, which becomes gradually thick as it is directed from the side of the starting position 506 (C1) toward the side of the ending position 508 (C2). That is, around the side of the starting position 506 (C1) it is narrowest, and around the side of the ending position 508 (C2) it is thickest.

By displaying the stretchable cursor 402 with such a shape, the electronic device system 100 can allow the user to distinguish the side of the starting point 404 (D1) of the drag 412 from the side of the ending point 406 (D2) thereof, in the stretchable cursor 402. Further, as a result, the user can recognize the direction from the starting point 404 (D1) of the drag 412 to the ending point 406 (D2) thereof (that is, the starting point and ending point direction). Further, the user can recognize the positions of the starting point 404 (D1) and the ending point 406 (D2) of the drag 412 (that is, the starting point and ending point positions).

Further, during the drag 412, the starting position 506 (C1) of the stretchable cursor 402 corresponding to the starting point 404 (D1) of the drag 412 can be fixed, whereas the ending position 508 (C2) of the stretchable cursor 402 corresponding to the ending point 406 (D2) of the drag 412 can move along the movement of the finger. Accordingly, the electronic device system 100 can allow the user to perform the drag 412 while allowing the user to recognize the starting point and ending point distance, the starting point and ending point direction, and the starting point and ending point positions of the drag 412.

Further, the stretchable cursor 402 can include a starting portion 510 of the side of the starting position 506 (C1) having a semicircle of a starting end radius 512 (R1) around the starting position 506 (C1). In this way, the user can recognize that the center of the semicircle is the position of the starting point 404 (D1) of the drag 412. Thus, the user can correctly recognize the position of the starting point 404 (D1) of the drag 412.

Similarly, the stretchable cursor 402 can include an ending portion 514 of the side of the ending position 508 (C2) having a semicircle of an ending portion radius 516 (R2) around the ending position 508 (C2). In this way, the user can recognize that the center of the semicircle is the position of the ending point 406 (D2) of the drag 412. Thus, the user can correctly recognize the position of the ending point 406 (D2) of the drag 412.

The stretchable cursor 402 can be set so that the ending portion radius 516 (R2) of the side of the ending position 508 (C2) is larger than the starting end radius 512 (R1) of the side of the starting position 506 (C1). As such, the stretchable cursor 402 can become gradually thick as it is directed from the starting position 506 (C1) toward the ending position 508 (C2).

The computing device 302 can translucently display the stretchable cursor 402. Further, if the drag 412 is terminated by disengaging the finger from the touch screen 104, the computing device 302 can delete the stretchable cursor 402 from the screen after moving the side of the ending position 508 (C2) of the stretchable cursor 402 close to the side of the starting position 506 (C1) to reduce the stretchable cursor 402 to a circle shape.

Further, the computing device 302 can receive a variety of manipulation inputs based on the positions of the starting position 506 (C1) and the ending position 508 (C2) of a displayed extendable cursor, depicted as the stretchable cursor 402, the direction from the starting position 506 (C1) to the ending position 508 (C2), the distance from the starting position 506 (C1) to the ending position 508 (C2), or the like. Hereinafter, the direction from the starting position 506 (C1) of an extensible cursor, depicted as the stretchable cursor 402, to the ending position 508 (C2) thereof is referred to as the direction of the stretchable cursor 402, and the distance from the starting position 506 (C1) of the extensible cursor to the ending position 508 (C2) thereof is referred to as the cursor length 410 of FIG. 4 of the stretchable cursor 402.

It has been discovered that the stretchable cursor 402 having the ending portion 514 larger than the starting portion 510 improves accuracy for the user to recognize and perform a manipulation input.

Figure 6:
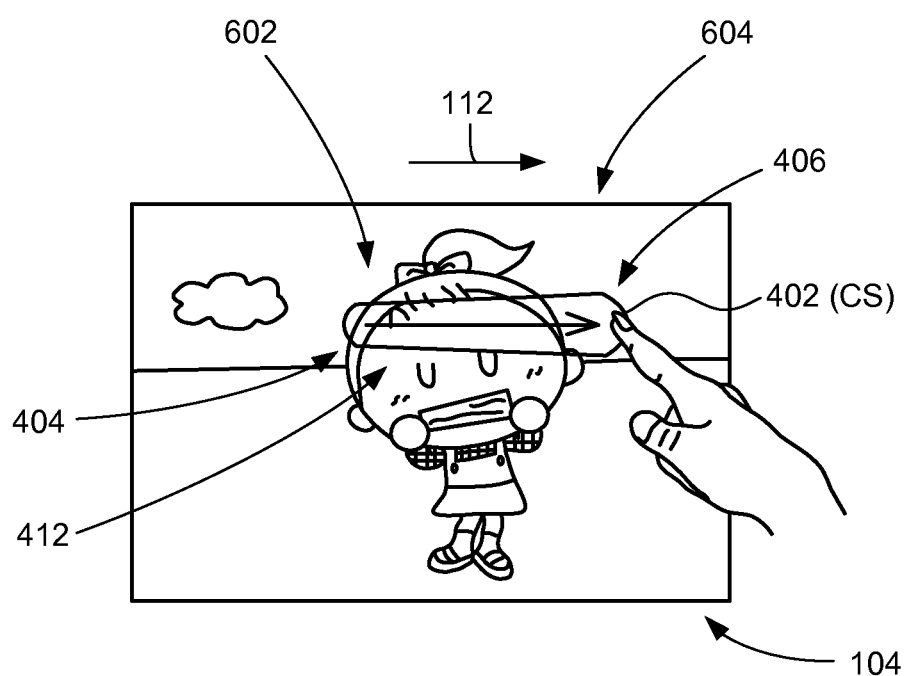
FIG. 6 is a diagram schematically illustrating a first control of a reproduction speed.

Referring now to FIG. 6, therein is shown a diagram schematically illustrating a first control of a reproduction speed 602. The computing device 302 of FIG. 3 can control the reproduction speed 602 of a moving image 604, for example, based on the manipulation input through the stretchable cursor 402. The reproduction speed 602 and the moving image 604 can represent the reproduction speed and the moving image previously described in the figures above.

The computing device 302 can reproduce the moving image 604 in a forward direction at 1× speed, and for example, display the moving image 604 to be transversely long for the touch screen 104 in the transverse direction 112. Here, for example, it can be assumed that the drag 412 is performed in the transverse direction 112 on the screen. Then, the computing device 302 can display the stretchable cursor 402, which stretches from the starting point 404 of the drag 412 to the ending point 406 thereof in the transverse direction 112, based on the drag 412, on the screen.

Figure 7:
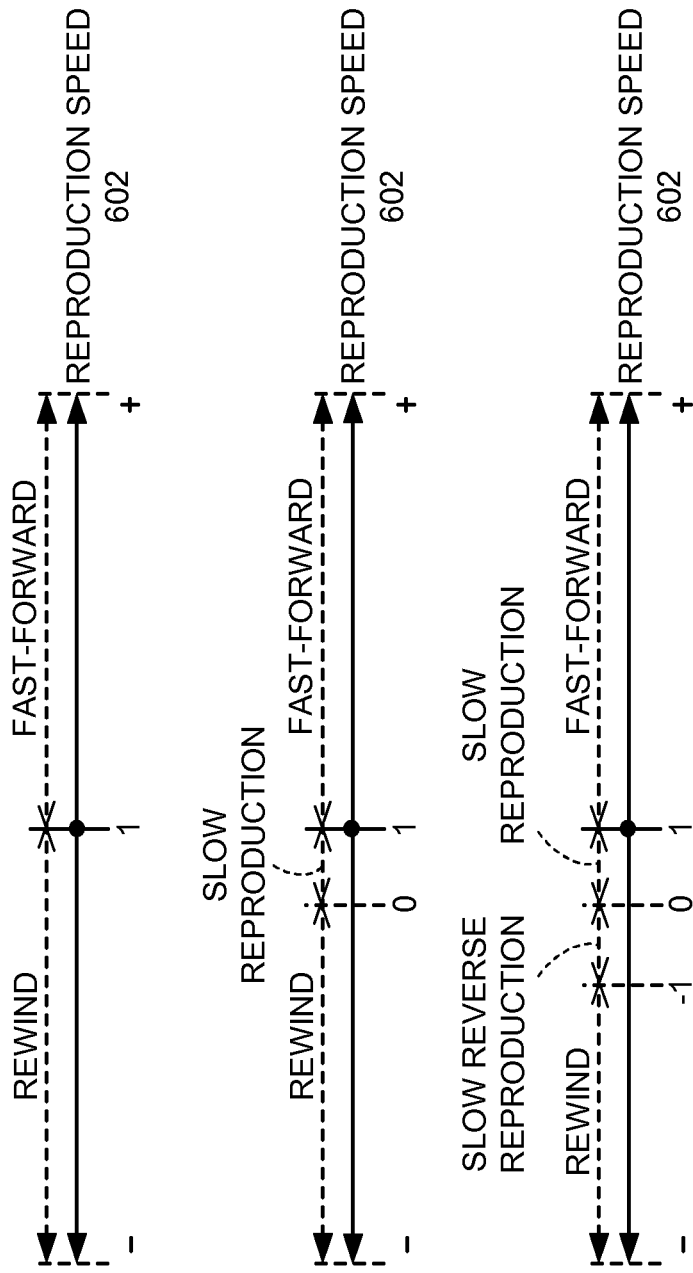
FIGS. 7A to 7C are diagrams schematically illustrating a second control of the reproduction speed.

Referring now to FIGS. 7A to 7C, therein are shown diagrams schematically illustrating a second control of the reproduction speed 602. As shown in FIG. 7A, the direction of the stretchable cursor 402 of FIG. 4 can be rightward. The computing device 302 of FIG. 3 can set a sign of the reproduction speed 602 to be positive (that is, the reproduction direction is a forward direction), and can reproduce the moving image 604 of FIG. 6 in the forward direction faster than 1× speed (that is, fast-forward). Further, on the other hand, if the direction of the stretchable cursor 402 is leftward, the computing device 302 can set a sign of the reproduction speed 602 to be negative (that is, the reproduction direction is a reverse direction), and reproduce the moving image 604 in the forward direction faster than 1× speed (that is, rewind). The 1× speed is a normal rate at which reproduction is performed or generated.

Figure 8:
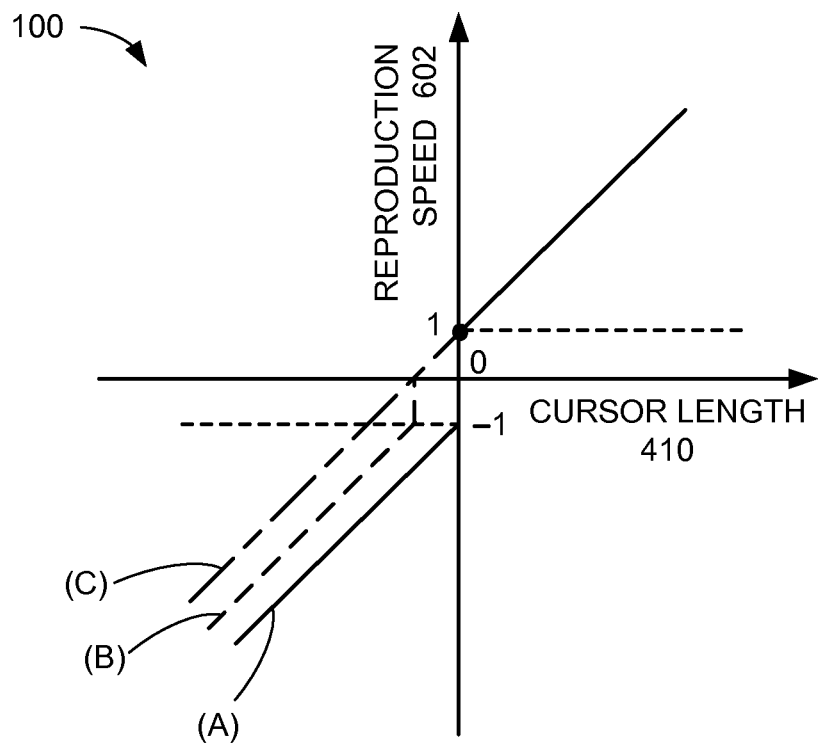
FIG. 8 is a diagram schematically illustrating a third control of the reproduction speed.

Referring now to FIG. 8, therein is shown a diagram schematically illustrating a third control of the reproduction speed 602. Further, at this time, as shown in (A) of FIG. 8, the computing device 302 of FIG. 3 can set the reproduction speed value to a large value, as the cursor length 410 of the stretchable cursor 402 of FIG. 4 becomes long. In the graphs of FIG. 8 and thereafter, for the convenience of description, it can be assumed that a sign of the cursor length 410 of an extensible cursor when the stretchable cursor 402 is directed to rightward (or upward) is set to be positive, and a sign of the cursor length 410 of an extensible cursor, depicted as the stretchable cursor 402, when the stretchable cursor 402 is directed to leftward (or downward) is set to be negative.

In this way, the electronic device system 100 can fast-forward or rewind the moving image 604 at a desired reproduction speed, depicted as the reproduction speed 602, by the manipulation input through the stretchable cursor 402, while showing the starting point and ending point direction of the drag 412 of FIG. 4 and the starting point and ending point distance thereof to the user using the stretchable cursor 402. Thereafter, if the finger is disengaged from the touch screen 104 of FIG. 1 and the drag 412 is terminated, the computing device 302 can reduce the stretchable cursor 402 and delete it from the screen.

At the same time, the computing device 302 again can reproduce the moving image 604 of FIG. 6 in a forward direction at 1× speed. Further, as shown in FIG. 7B and (B) of FIG. 8, based on the manipulation input through the stretchable cursor 402, a reproduction mode in which the moving image 604 is slowly reproduced (that is, reproduction slower than 1× speed in a forward speed) can be separately provided.

In this case, in a similar way to the case shown in FIG. 7A and (A) of FIG. 8, the computing device 302 can reproduce the moving image 604 in a forward direction faster than 1× speed (that is, fast-forward), if the direction of the stretchable cursor 402 is rightward. Further, at this time, the computing device 302 can set the reproduction speed value to a large value, as the cursor length 410 of the stretchable cursor 402 becomes long.

On the other hand, in a case where the direction of the stretchable cursor 402 is leftward and the cursor length 410 of the stretchable cursor 402 is shorter than a predetermined value, the computing device 302 can reproduce the moving image 604 in a forward direction slower than 1× speed (slow reproduction). Further, at this time, as the cursor length 410 of the stretchable cursor 402 becomes long, the computing device 302 can set the reproduction speed value to a small value (that is, the reproduction speed 602 of slow reproduction becomes slower).

Further, if the direction of the stretchable cursor 402 is leftward and the cursor length 410 of the stretchable cursor 402 is equal to or longer than a predetermined value, the computing device 302 can reproduce the moving image 604 in a reverse direction faster than 1× speed (that is, rewind). Further, at this time, as the cursor length 410 of the stretchable cursor 402 becomes long, the computing device 302 can set the reproduction speed value to a large value (that is, the reproduction speed 602 of rewind becomes faster).

Further, as shown in FIG. 7C and (C) of FIG. 8, based on the manipulation input through the stretchable cursor 402, a reproduction mode for a slow reverse reproduction (that is, reproduction slower than 1× speed in a reverse direction), in addition to the slow reproduction of the moving image 604, can be separately provided. In this case, in a similar way to the case shown in FIG. 7A and (A) of FIG. 8, the computing device 302 can reproduce the moving image 604 in a forward direction faster than 1× speed (that is, fast-forward), if the direction of the stretchable cursor 402 is rightward. Further, at this time, the computing device 302 can set the reproduction speed value to a large value, as the cursor length 410 of the stretchable cursor 402 becomes long.

On the other hand, in a similar way to the case shown in FIG. 7B and (B) of FIG. 8, in a case where the direction of the stretchable cursor 402 is leftward and the cursor length 410 of the stretchable cursor 402 is shorter than a predetermined first value, the computing device 302 can reproduce the moving image 604 in a forward direction slower than 1× speed (that is, slow reproduction). Further, at this time, the computing device 302 can set the reproduction speed value to a small value, as the cursor length 410 of the stretchable cursor 402 becomes long (that is, the reproduction speed 602 of the slow reproduction becomes slower).

Further, in a case where the direction of the stretchable cursor 402 is leftward and the cursor length 410 of the stretchable cursor 402 is equal to or longer than the predetermined first value and shorter than a predetermined second value, the computing device 302 can reproduce the moving image 604 in a reverse direction slower than 1× speed (that is, slow reverse reproduction). Further, at this time, the computing device 302 can set the reproduction speed value to a large value, as the cursor length 410 of the stretchable cursor 402 becomes long (that is, the reproduction speed 602 of the slow reverse reproduction becomes faster).

Further, in a case where the direction of the stretchable cursor 402 is leftward and the cursor length 410 of the stretchable cursor 402 is equal to or longer than the predetermined second value, the computing device 302 can reproduce the moving image 604 in a reverse direction faster than 1× speed. Further, at this time, the computing device 302 can set the reproduction speed value to a large value, as the cursor length 410 of the stretchable cursor 402 becomes long (that is, the reproduction speed 602 of rewind becomes faster).

Figure 9:
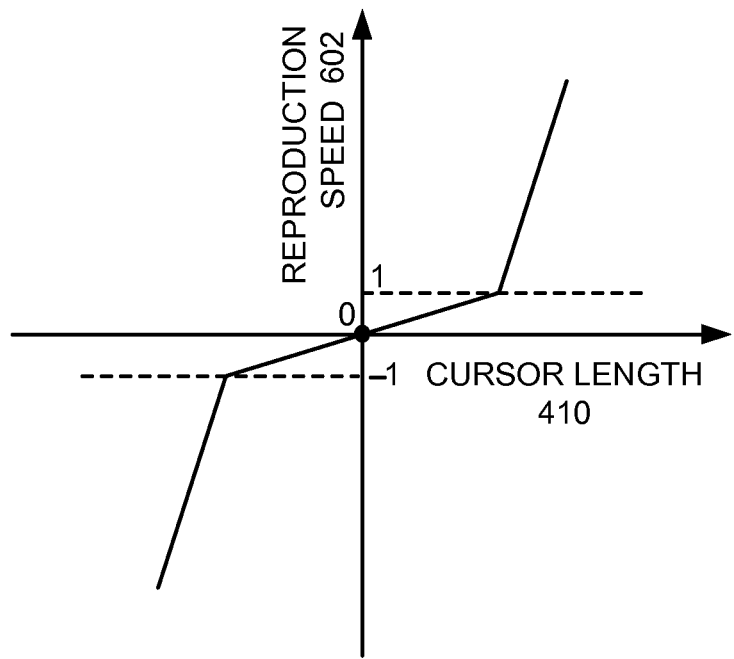
FIG. 9 is a diagram schematically illustrating a control of the reproduction speed in an edit mode.

Referring now to FIG. 9, therein is shown a diagram schematically illustrating a control of the reproduction speed 602 in an edit mode. Besides the reproduction modes as previously described, the edit mode can be separately provided for editing the moving image 604 of FIG. 6. In the case of the edit mode, the computing device 302 of FIG. 3 can set the reproduction speed 602 as "zero" in a state where the drag 412 of FIG. 4 is not performed (that is, the moving image 604 is displayed in a temporary stop state).

In this state, if the drag 412 is performed, the computing device 302 can set a sign of the reproduction speed 602 to be positive (that is, the reproduction direction is a forward direction) if the direction of the stretchable cursor 402 of FIG. 4 is rightward, and make or set the value of the reproduction speed 602 larger, as the stretchable cursor 402 becomes longer, from the state where the reproduction speed 602 is "zero". On the other hand, if the direction of the stretchable cursor 402 is leftward, the computing device 302 can set a sign of the reproduction speed 602 to be negative (that is, the reproduction direction is a reverse direction), and make or set the value of the reproduction speed 602 larger, as the stretchable cursor 402 becomes longer, from the state where the reproduction speed 602 is "zero".

Further, at this time, the computing device 302 can slow or adjust an increasing or decreasing level of the reproduction speed 602 for the cursor length 410 of the stretchable cursor 402, when the reproduction speed 602 is slower than 1× speed in a forward direction or a reverse direction, compared with a case where the reproduction speed 602 is faster than 1× speed in a forward direction or a reverse direction. That is, in the edit mode, while the moving image 604 is slowly reproduced or slowly reversely reproduced, the reproduction speed 602 can be minutely adjusted.

Then, if the finger is disengaged from the touch screen 104 of FIG. 1 and the drag 412 is terminated, the computing device 302 can reduce the stretchable cursor 402 and delete it from the screen. At the same time, the computing device 302 again can set the reproduction speed 602 of the moving image 604 as "zero" (that is, the moving image 604 is displayed in a temporary stop state).

In this way, the computing device 302 can control the reproduction speed 602 of the moving image 604 based on the manipulation input through the stretchable cursor 402. Further, the computing device 302 can control a scroll speed of a variety of lists, images or the like, for example, based on the manipulation input through the stretchable cursor 402.

Specifically, the computing device 302 can control a sign of a scroll speed (that is, scroll direction) based on the direction of the stretchable cursor 402, and controls a value of the scroll speed based on the cursor length 410 of the stretchable cursor 402.

Referring now to FIGS. 10A to 10C, therein are shown diagrams schematically illustrating a control of the scroll speed 1002. The scroll speed 1002 is a rate at which display information, including a variety of lists or images, is moved on the touch screen 104 based on manipulation of the stretchable cursor 402.

For example, as shown in FIG. 10A, a list in which music titles (track) are longitudinally arranged in tandem (referred to as a track list) is displayed on the touch screen 104 in the longitudinal direction 110. Here, if the drag 412 of FIG. 4 is performed in the longitudinal direction 110 on the screen, the computing device 302 of FIG. 3 can display the stretchable cursor 402, which stretches from the starting point 404 of FIG. 4 of the drag 412 to the ending point 406 of FIG. 4 thereof on the screen in the longitudinal direction 110, based on the drag 412.

Further, if the direction of the stretchable cursor 402 is upward, the computing device 302 can set a sign of the scroll speed 1002 to be positive and sets a scroll direction to a direction in which the track list is scrolled from the upward to the downward. Further, on the other hand, if the direction of the stretchable cursor 402 is downward, the computing device 302 can set a sign of the scroll speed 1002 to be negative and sets the scroll direction to a direction in which the track list is directed from the downside to the upside.

Further, as shown in FIG. 10C, the computing device 302 can set the scroll speed 1002 value to a large value, as the cursor length 410 of FIG. 4 of the stretchable cursor 402 becomes long. Further, on the other hand, for example, as shown in FIG. 10B, a list in which a plurality of still images 1004 is transversely arranged in tandem can be displayed on the touch screen 104 in the transverse direction 112. The still images 1004 can represent the still image or the still images as previously described in the figures above.

Here, if the drag 412 is performed in the transverse direction 112 on the screen, the computing device 302 can display the stretchable cursor 402, which stretches from the starting point 404 of the drag 412 to the ending point 406 thereof in the transverse direction 112, on the screen, based on the drag 412. Further, if the direction of the stretchable cursor 402 is rightward, the computing device 302 can set a sign of the scroll speed 1002 to be positive and set the scroll direction to a direction in which the still images 1004 are scrolled from the right to the left. Further, on the other hand, if the direction of the stretchable cursor 402 is leftward, the computing device 302 can set a sign of the scroll speed 1002 to be negative and sets the scroll direction to a direction in which the still images 1004 are scrolled from the left to the right.

Further, as shown in FIG. 10C, the computing device 302 can set the scroll speed 1002 value to a large value, as the cursor length 410 of the stretchable cursor 402 becomes long. In this way, the electronic device system 100 can scroll the variety of lists, images or the like in a desired direction and at a desired speed, through the manipulation input through the stretchable cursor 402, while showing the starting point and ending point direction and the starting point and ending point distance of the drag 412 to the user.

Thereafter, if the drag 412 is terminated, the computing device 302 can move the ending point 406 side of the stretchable cursor 402 close to the starting point 404 side thereof to reduce an extended extendable cursor, depicted as the stretchable cursor 402, to a circle, and then deletes the stretchable cursor 402 from the screen, to terminate the scroll.

Further, the computing device 302 can control an adjustment speed of a variety of parameters (sound volume, image zoom rate, luminance, color saturation and the like), for example, based on the manipulation input through the stretchable cursor 402. Specifically, the computing device 302 can control a sign (that is, adjustment direction) of the adjustment speed of the parameters based on the direction of the stretchable cursor 402, and control a value of the adjustment speed based on the cursor length 410 of the stretchable cursor 402.

Figure 11A:
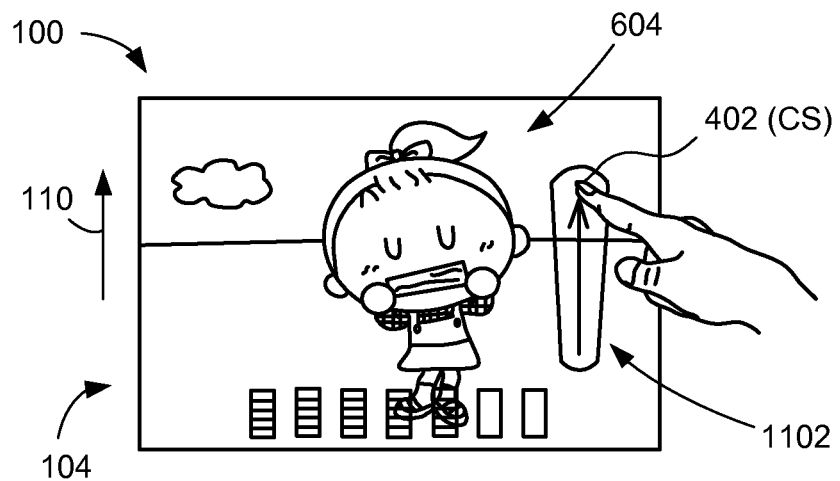
FIGS. 11A and 11B are diagrams schematically illustrating a control of a parameter adjustment speed.
Figure 11B:
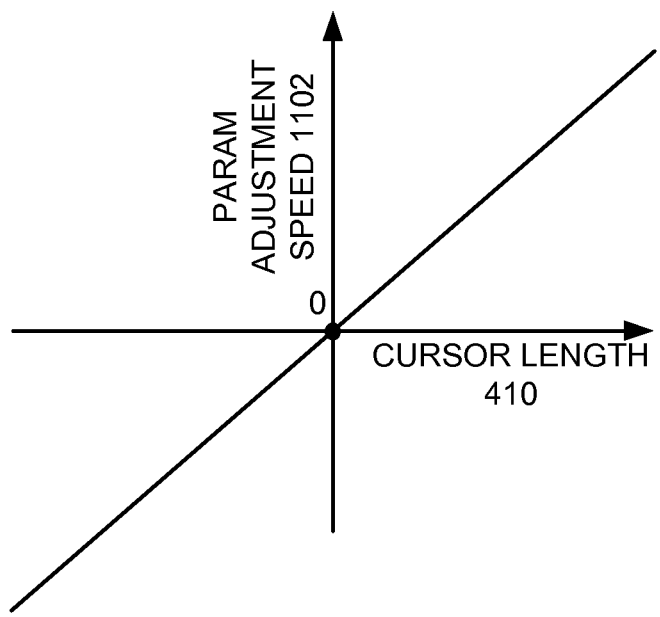

Referring now to FIGS. 11A and 11B, therein are shown diagrams schematically illustrating a control of a parameter adjustment speed 1102. For example, as shown in FIG. 11A, it can be assumed that a transversely long moving image, depicted as the moving image 604, is displayed on the touch screen 104 that is transversely oriented. Here, if the drag 412 of FIG. 4 is performed in the longitudinal direction 110 on the screen, the computing device 302 of FIG. 3 can display the stretchable cursor 402, which stretches from the starting point 404 of FIG. 4 of the drag 412 to the ending point 406 of FIG. 4 thereof in the longitudinal direction 110, on the screen, based on the drag 412.

Further, if the direction of the stretchable cursor 402 is upward, the computing device 302 can set a sign of an adjustment speed of a sound volume to be positive and sets the adjustment direction as a sound volume-up direction. Further, on the other hand, if the direction of the stretchable cursor 402 is downward, the computing device 302 can set a sign of the adjustment speed of the sound volume to be negative and sets the adjustment direction as a sound volume-down direction.

Further, as shown in FIG. 11B, the computing device 302 can set the adjustment speed value of the sound volume to a large value, as the cursor length 410 of the stretchable cursor 402 becomes long at this time. If the drag 412 is terminated, the computing device 302 can reduce the stretchable cursor 402 and delete it from the screen, to terminate the sound volume adjustment. Then, the sound volume right before the drag 412 is terminated can be maintained.

In this way, the electronic device system 100 can perform adjustment by turning up or down the sound volume which is a sound parameter associated with the moving image 604 at a predetermined adjustment speed, through the manipulation input through the stretchable cursor 402. The electronic device system 100 can perform the adjustment while showing the starting point and ending point direction of the drag 412 and the starting point and ending point distance thereof to the user, using the stretchable cursor 402.

In this way, if the drag 412 is performed, the electronic device system 100 can display the stretchable cursor 402 indicating the starting point and ending point positions of the drag 412, the starting point and ending point direction thereof, and the starting point and ending point distance thereof, and receive the various manipulation inputs based on the direction and the cursor length 410 of the stretchable cursor 402.

Next, with respect to the manipulation input with the above-described extendable cursor, such as the stretchable cursor 402, a manipulation input example in an application installed in the electronic device system 100 will be described in detail. A variety of applications can be installed in the electronic device system 100. Here, as an example, it can be assumed that an application for reproducing music and an application for reproducing the moving image 604 are installed therein.

Here, firstly, a manipulation input through the stretchable cursor 402 in the application for reproducing the moving image 604 (referred to as a moving image reproduction application) will be described in detail. In a state where an icon corresponding to an operation of the moving image reproduction application is displayed on the touch screen 104, if the icon is tapped, the computing device 302 receives the touch manipulation as a manipulation input for operating the moving image reproduction application.

Further, the computing device 302 can read out a program of the moving image reproduction application from the non-volatile memory 304 of FIG. 3 and execute it, to operate the moving image reproduction application. If the moving image reproduction application is operated, the computing device 302 can display a thumbnail list of a plurality of the moving image 604 stored in the non-volatile memory 304 as a moving image file on the touch screen 104.

Further, if one thumbnail is tapped from among the displayed thumbnails, the computing device 302 can receive the touch manipulation as the manipulation input for reproducing the moving image 604. Further, the computing device 302 can obtain the moving image 604 from a moving image file corresponding to the tapped thumbnail.

Figure 12:
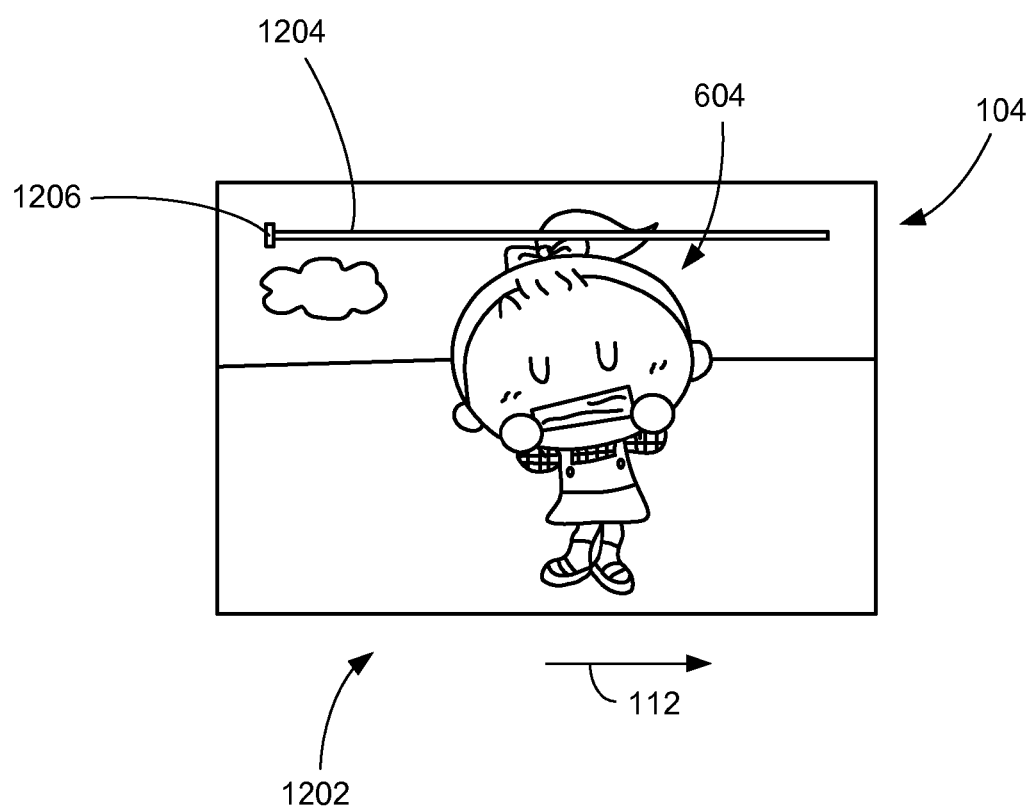
FIG. 12 is a diagram schematically illustrating a configuration of a moving image reproduction screen.

Referring now to FIG. 12, therein is shown a diagram schematically illustrating a configuration of a moving image reproduction screen 1202. Further, at this time, the computing device 302 of FIG. 3 can display the moving image reproduction screen 1202 on the touch screen 104. The moving image reproduction screen 1202 is a transversely long screen, which is displayed on the entire surface of the touch screen 104 in a transversely long configuration, in consideration of being used in the transverse direction 112. For illustrative purposes, the moving image reproduction screen 1202 is shown in a landscape orientation having the longer and shorter sides in the horizontal and vertical directions, respectively.

The moving image 604 can be displayed on nearly the entire area of the moving image reproduction screen 1202. Further, the moving image reproduction screen 1202 can be configured so that a bar 1204, which stretches from a left edge of the screen to a right edge thereof, near an upper edge thereof, is overlapped on the moving image 604 for display. The bar 1204 can include one end on the left edge side of the screen, which represents a leading portion of the moving image 604, and the other end on the right edge side of the screen, which represents a trailing portion of the moving image 604. The bar 1204 indicates a current reproduction position of the moving image 604 using a pointer 1206 which moves along the bar 1204. Hereinafter, the bar 1204 is also referred to as a reproduction bar.

The computing device 302 can display the moving image 604 reproduced in a forward direction at 1× speed from the leading portion, on the moving image reproduction screen 1202. The 1× speed reproduction in a forward direction is referred to as a normal reproduction, hereinafter. Here, the reproduction of the moving image 604 can be controlled by the drag 412 of FIG. 4 in the transverse direction 112 on the moving image reproduction screen 1202.

Referring now to FIGS. 13A to 13D, therein are shown diagrams schematically illustrating a first manipulation input example through the stretchable cursor 402 in a moving image reproduction application. As shown in FIG. 13A, it can be assumed that the drag 412 of FIG. 4 is performed in the transverse direction 112 on the screen.

Then, the computing device 302 of FIG. 3 can display the stretchable cursor 402 that stretches from the starting point 404 of the drag 412 to the ending point 406 of FIG. 4 thereof in the transverse direction 112, on the screen, based on the drag 412. The stretchable cursor 402 can be continuously displayed until the finger is disengaged from the touch screen 104 and the drag 412 is terminated.

Here, if the computing device 302 recognizes that the direction of a displayed extendable cursor, such as the stretchable cursor 402, is transverse, the computing device 302 can control the reproduction speed 602 of FIG. 6 (reproduction direction and reproduction speed value) of the moving image 604 of FIG. 6, which is displayed on the screen, based on the direction and the cursor length 410 of FIG. 4 of the stretchable cursor 402. Specifically, if the direction of the displayed extendable cursor is rightward, the computing device 302 can set a sign of the reproduction speed 602 to be positive, and set the reproduction direction to a forward direction.

Further, on the other hand, if the direction of a displayed extendable cursor, depicted as the stretchable cursor 402, is leftward, the computing device 302 can set a sign of the reproduction speed 602 to be negative, and set the reproduction direction to a reverse direction. Further, at this time, the computing device 302 can set the reproduction speed value to a large value, as the cursor length 410 of the stretchable cursor 402 becomes long.

As a result, for example, the stretchable cursor 402 can stretch long to the right by the drag 412 to the right of the screen, the moving image 604 displayed on the moving image reproduction screen 1202 of FIG. 12 can rapidly reproduced in a forward direction (that is, fast-forward). Further, if the stretchable cursor 402 stretches short to the left by the drag 412 to the left of the screen, the moving image 604 displayed on the moving image reproduction screen 1202 can be slowly reproduced in a reverse direction (that is, rewind).

Further, after the drag 412 occurs in the transverse direction 112 on the screen and the finger is not disengaged from the touch screen 104 and not moved, the direction and the cursor length 410 can be continuously displayed without any change. In this case, the reproduction speed 602 (reproduction direction and reproduction speed value) can be maintained.

Thereafter, the drag 412 can be terminated. That is, the finger can be disengaged from the touch screen 104. Then, the computing device 302 can move the ending point side of the stretchable cursor 402 close to the starting point 404 side thereof. The stretchable cursor 402, which stretches in the transverse direction 112, can be reduced until the stretchable cursor 402 becomes a circular shape. The computing device 302 can then delete the stretchable cursor 402 from the screen.

Further, at this time, the computing device 302 can return the reproduction speed 602 to the initial value (forward direction, 1× speed). Thus, the moving image 604 displayed on the moving image reproduction screen 1202 can be normally reproduced.

In this way, on the moving image reproduction screen 1202, the moving image 604 can be reproduced at a desired value of the reproduction speed 602, through the manipulation input through the stretchable cursor 402, while the starting point and ending point direction of the drag 412 and the starting point and ending point distance thereof are shown to the user, using the stretchable cursor 402.

Hereinbefore, although the sound associated with the moving image 604 has not been described, the reproduction of the sound can also be controlled by the drag 412, in a similar way to the moving image 604.

Further, as shown in FIG. 13B, on the moving image reproduction screen 1202, after the drag 412 occurs in the transverse direction 112 on the screen, the drag 412 can be continuously performed in the longitudinal direction 110 on the screen. Then, even though the finger is disengaged, the reproduction speed 602 (reproduction direction and reproduction speed value) can be maintained.

At this time, since the movement of the finger is a movement in which the ending point portion of the stretchable cursor 402 is pasted on the screen, the drag 412 in the longitudinal direction 110 on the screen is referred to as a paste manipulation hereinafter. Here, the paste manipulation can include a horizontal drag 1302, which is formed in the upper direction on the screen, and a vertical drag 1304, which is formed in the downward direction on the screen. Both the horizontal drag 1302 and the vertical drag 1304 can be used as the paste manipulation, or only one of the horizontal drag 1302 and the vertical drag 1304 can be used as the paste manipulation. For example, the vertical drag 1304 in the downward direction can be used as the paste manipulation.

As shown in FIG. 13B, it can be assumed that the paste manipulation is performed for the stretchable cursor 402 in a state where the stretchable cursor 402 is displayed by the drag 412 in the transverse direction 112 on the screen. Then, the computing device 302 can maintain the reproduction direction and the reproduction speed value set based on the direction and the cursor length 410 at this time, based on the paste manipulation, even after the paste manipulation.

That is, the computing device 302 can maintain the reproduction speed 602 (reproduction direction and reproduction speed value) set right before the paste manipulation is performed after the paste manipulation, that is, after the finger is disengaged, to reproduce the moving image 604. As a result, after the finger is disengaged, the moving image 604 can be continuously reproduced at the reproduction speed 602 (reproduction direction and reproduction speed value) set right before the finger is disengaged, on the moving image reproduction screen 1202.

Further, at this time, as shown in FIG. 13C, the computing device 302 can display reproduction speed information 1306 indicating the reproduction speed 602 around the stretchable cursor 402, reduce the stretchable cursor 402 to a circle, and then delete the stretchable cursor 402 from the screen. For example, a displayed reproduction speed information, depicted as the reproduction speed information 1306, is "3.0×" in the case of 3× speed in a forward direction, "3.0×", and is "−2.0×" in the case of 2× speed in a reverse direction. The reproduction speed information 1306 is information indicating to the user for recognizing which process is continuously performed.

That is, after the paste manipulation occurs, the moving image 604, which is continuously reproduced at the reproduction speed 602 set right before the paste manipulation, and the reproduction speed information 1306 indicating the reproduction speed 602 are displayed on the moving image reproduction screen 1202.

As shown in FIG. 13D, if the touch screen 104 can be tapped, the computing device 302 can return the reproduction speed 602 to the initial value (forward direction, 1× speed). Thus, the moving image 604 displayed on the moving image reproduction screen 1202 can be normally reproduced.

In this way, on the moving image reproduction screen 1202, if the paste manipulation is performed to a displayed extendable cursor, depicted as the stretchable cursor 402, the reproduction speed 602 right before the paste manipulation is performed can be also be maintained after the paste manipulation, to continuously reproduce the moving image 604. In this way, on the moving image reproduction screen 1202, even though the finger is disengaged after the paste manipulation, the moving image 604 can be continuously reproduced at a desired value of the reproduction speed 602.

As described above, in the moving image reproduction application, a transverse extendable cursor, depicted as the stretchable cursor 402, can be displayed on the moving image reproduction screen 1202 based on the drag 412 in the transverse direction 112. Further, in the moving image reproduction application, the reproduction direction and the reproduction speed value are set while the moving image 604 is reproduced, based on the direction (leftward or rightward) and the length of the displayed extendable cursor. In this way, in the moving image reproduction application, the reproduction direction and the reproduction speed value of the moving image 604 can be freely set only using the manipulation input through the stretchable cursor 402 to reproduce the moving image 604.

Further, in the moving image reproduction application, if the paste manipulation is performed to a displayed extendable cursor, depicted as the stretchable cursor 402, the reproduction speed 602 (reproduction direction and reproduction speed value) right before the paste manipulation is performed can also be maintained after the paste manipulation. In this way, in the moving image reproduction application, the reproduction speed 602 set by the manipulation input through the stretchable cursor 402 can also be maintained after the finger is disengaged, to continuously reproduce the moving image 604 at a desired value of the reproduction speed 602.

Further, on the moving image reproduction screen 1202, a sound volume can be adjusted (that is, increased or decreased) in the drag 412 in the longitudinal direction 110. The sound volume is a parameter of a sound associated with the moving image 604.

Figures 14A, 14B:
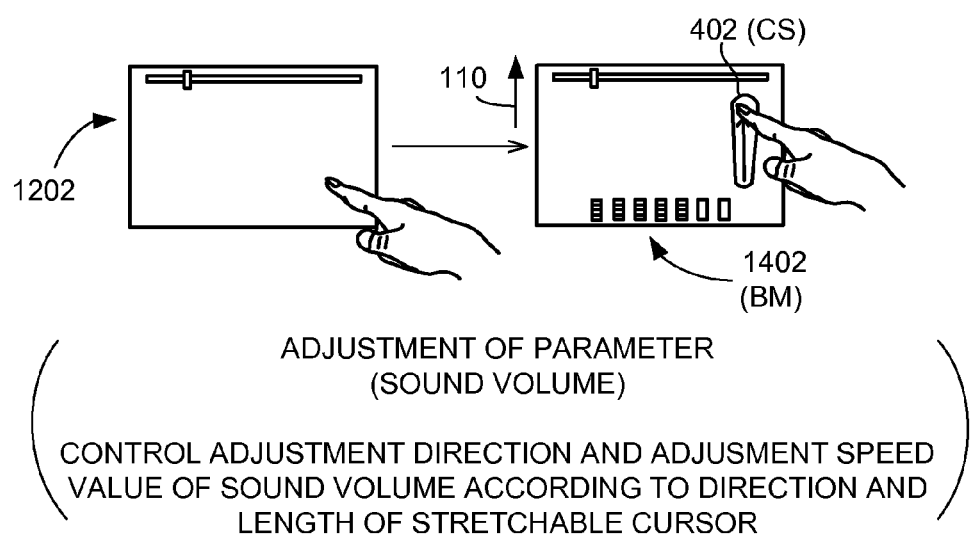
FIGS. 14A and 14B are diagrams schematically illustrating a second manipulation input example through a stretchable cursor in a moving image reproduction application.

Referring now to FIGS. 14A and 14B, therein are shown diagrams schematically illustrating a second manipulation input example through a stretchable cursor in a moving image reproduction application. As shown in FIGS. 14A and 14B, it can be assumed that the drag 412 of FIG. 4 is performed in the longitudinal direction 110 on the screen. Then, the computing device 302 of FIG. 3 can display the stretchable cursor 402, which stretches from the starting point 404 of FIG. 4 of the drag 412 to the ending point 406 of FIG. 4 of the drag 412 in the longitudinal direction 110, on the screen, based on the drag 412. Here, if the computing device 302 recognizes that the direction of a displayed extendable cursor, depicted as the stretchable cursor 402, is longitudinal, the computing device 302 can control the adjustment speed (adjustment direction and adjustment speed value) of the sound volume based on the direction and the cursor length 410 of FIG. 4 of the stretchable cursor 402 at this time, to increase or decrease the sound volume.

Specifically, if the direction of a displayed extendable cursor, depicted as the stretchable cursor 402, is upward, the computing device 302 can set a sign of the adjustment speed to be positive, and set the adjustment direction of the sound volume as a sound volume-up direction. Further, on the other hand, if the direction of a displayed extendable cursor, depicted as the stretchable cursor 402, is downward, the computing device 302 can set a sign of the adjustment speed to be negative, and set the adjustment direction of the sound volume as a sound volume-down direction.

As the cursor length 410 becomes long at this time, the computing device 302 can set the adjustment speed value of the sound volume to a large value. As a result, for example, if the stretchable cursor 402 stretches long upward based on the drag 412 in the upward direction on the screen, the sound volume turns up at once.

Further, for example, if the stretchable cursor 402 stretches in a short distance downwardly based on the drag 412 in the upward direction on the screen, the sound volume slowly can turn down. In this way, on the moving image reproduction screen 1202, the computing device 302 can adjust the sound volume at a desired adjustment speed based on the direction and the length of the drag 412, while allowing the user to recognize the direction and length of the drag 412 using the stretchable cursor 402.

Further, at this time, the computing device 302 can display a sound volume bar 1402, depicted as BM, indicating a current sound volume in a predetermined position of the screen. For example, the predetermined position can be at the lower center of the screen. Thus, the user can adjust the sound volume while recognizing the current sound volume by viewing the sound volume bar 1402.

Then, if the drag 412 is terminated, the computing device 302 can move the ending point side of the stretchable cursor 402 close to the starting point side thereof, reduce the stretchable cursor 402, which stretches in the longitudinal direction 110 to a circular shape. The computing device 302 can then delete the stretchable cursor 402 from the screen, to terminate the adjustment of the sound volume. Then, the sound volume right before the drag 412 is terminated can be maintained.

In this way, in the moving image reproduction application, a longitudinal extendable cursor, depicted as the stretchable cursor 402, can be displayed on the moving image reproduction screen 1202 based on the drag 412 in the longitudinal direction 110. Further, in the moving image reproduction application, the adjustment direction and reproduction speed value of the sound volume can be set, based on the direction (upward or downward) and length of a displayed extendable cursor, depicted as the stretchable cursor 402. In this way, in the moving image reproduction application, the computing device 302 can adjust the sound volume while freely changing the adjustment direction and the adjustment speed value, using only the manipulation input through the stretchable cursor 402 associated with the drag 412 in the longitudinal direction 110.

However, in order to change the adjustment direction of the sound volume on the moving image reproduction screen 1202, the user can firstly disengage the finger. The user can perform the drag 412 in a reverse direction to the previous direction or perform the drag 412 until the direction of the stretchable cursor 402 is reversed by changing the direction of the drag 412 to the reverse direction without disengaging the finger. For example, in order to change an upward extendable cursor, depicted as the stretchable cursor 402, to the downward direction, the user can perform the drag 412 by changing the direction of the drag 412 from the upward to the downward.

The user can perform the drag 412 until the ending position 508 (C2) of FIG. 5 of the stretchable cursor 402, disposed or located above the starting position 506 (C1) of FIG. 5 thereof, is disposed or located below the starting position 506 (C1). That is, the drag 412 can be reversely performed until the up and down position relation between the starting position 506 (C1) and the ending position 508 (C2) is reversed.

At this time, the computing device 302 can move the ending position 508 (C2) of the stretchable cursor 402 to the direction of the drag 412 (that is, the downward direction), and move the starting position 506 (C1) of the stretchable cursor 402 to the reverse direction to the direction of the drag 412 (that is, the upward direction).

Referring now to FIGS. 15A to 15C, therein are shown diagrams schematically illustrating a third manipulation input example through a stretchable cursor in a moving image reproduction application. For example, as shown in FIG. 15A, on the moving image reproduction screen 1202 of FIG. 12, it can be assumed that the direction of the drag 412 of FIG. 4 is reversed from the upward to the downward without disengaging the finger after an upward drag, depicted as the drag 412, is performed. Further, at this time, the stretchable cursor 402 can step over or overlap a first centerline 1502 (L1), which is a predetermined location of a line on the moving image reproduction screen 1202 that bisects the moving image reproduction screen 1202 into up and down portions. That is, the starting position 506 (C1) of FIG. 5 of the stretchable cursor 402 and the ending position 508 (C2) of FIG. 5 thereof divide the moving image reproduction screen 1202 into an upper side and a lower side above and below the first centerline 1502 (L1), respectively.

As shown in FIG. 15B, the computing device 302 of FIG. 3 can move the ending position 508 (C2) of the stretchable cursor 402 in the downward direction, based on a downward drag, depicted as the drag 412, at this time. The computing device 302 can also move the starting position 506 (C1) of the stretchable cursor 402 in the upward direction reverse to the direction of the drag 412.

At this time, the starting position 506 (C1) of the stretchable cursor 402 can move in the upward direction reverse to the direction of the drag 412, differently from the movement of the ending position 508 (C2) until it reaches the first centerline 1502 (L1). However, if it reaches the first centerline 1502 (L1), the starting position 506 (C1) of the stretchable cursor 402 can be fixed to the position and does not move.

If the direction of the drag 412 returns to the original upward direction from the downward direction before the starting position 506 (C1) of the stretchable cursor 402 reaches the first centerline 1502 (L1), the starting position 506 (C1) of the stretchable cursor 402 can move the downward direction reverse to the direction of the drag 412 until it reaches the original position.

The starting position 506 (C1) of the stretchable cursor 402 and the ending position 508 (C2) thereof can move in the reverse directions to be close to each other. The direction of the stretchable cursor 402 may not be changed, and the length can become short. As a result, the adjustment direction of the sound volume can maintain the sound volume-up direction, and the adjustment speed value of the sound volume can become small.

Further, it can be assumed that the ending position 508 (C2) of the stretchable cursor 402 is disposed below the starting position 506 (C1), and the direction of the stretchable cursor 402 is changed from the upward to the downward, at a certain time. Then, the computing device 302 can switch the adjustment direction of the sound volume from the sound volume-up direction to the sound volume-down direction.

As shown in FIG. 15C, if a downward drag, depicted as the drag 412, continues thereafter and the ending position 508 (C2) of the stretchable cursor 402 is disengaged from the starting position 506 (C1) thereof, the cursor length 410 of FIG. 4 can become long. As a result, the adjustment direction of the sound volume can maintain the sound volume-down direction, and the adjustment speed value of the sound volume can become large.

In this way, in the moving image reproduction application, if the direction of the drag 412 is reversed up and down, the ending position 508 (C2) of the stretchable cursor 402 can be moved based on the drag 412 and the starting position 506 (C1) thereof can be moved in a direction reverse to the direction of the drag 412. That is, the ending position 508 (C2) can be moved based on the drag 412 and the starting position 506 (C1) can be moved in a reverse direction to the ending position 508 (C2).

In this way, compared with a case where an only ending position, depicted as the ending position 508 (C2), of the stretchable cursor 402 is moved, the up and down position relation of the starting position 506 (C1) of the stretchable cursor 402 and the ending position 508 (C2) thereof can be reversed using a small amount of the drag 412 (movement amount of finger). Thus, the direction of the stretchable cursor 402 can be reversed. As a result, compared with a case where the only ending position of the stretchable cursor 402 is moved, the adjustment direction of the sound volume can be changed more easily.

Further, in this way, since the adjustment direction of the sound volume can be changed by reversing the direction of the stretchable cursor 402 using the small amount of the drag 412, even though the size of the screen is small, a desired manipulability can be obtained.

In addition, in a case where the only ending position of the stretchable cursor 402 is moved, for example, if the drag 412 is started from a lower edge of the screen, the starting position 506 (C1) can be fixed to the lower edge. Thus, it can be difficult to change the direction of the stretchable cursor 402 and to further extend the stretchable cursor 402 in the downward direction after the change.

In this respect, in the moving image reproduction application, as the starting position 506 (C1) of the stretchable cursor 402 moves close to the first centerline 1502 (L1), it can be possible to easily change the direction of the stretchable cursor 402 or to further extend the stretchable cursor 402 in the downward direction after the change. The direction can be easily changed even though the drag 412 is started from the lower edge of the screen.

Further, in the moving image reproduction application, if the starting position 506 (C1) of the stretchable cursor 402 reaches the first centerline 1502 (L1), the position of the starting position 506 (C1) can be fixed. Thus, hereinafter, when the stretchable cursor 402 stretches in the upward direction and in the downward direction, the stretching ranges can become the same. As a result, the adjustment speed of the sound volume can be set in a sufficiently wide range on a positive side and a negative side. In this way, in the moving image reproduction application, the adjustment direction of the sound volume can be changed by easily changing the direction of the stretchable cursor 402.

Next, the manipulation input through the stretchable cursor 402 in an application for reproducing music (track) (referred to as a music reproduction application) will be described in detail. In a state where the icon corresponding to an operation of the music reproduction application is displayed on the touch screen 104, if the icon is tapped, the computing device 302 can receive the touch manipulation as the manipulation input for operating the music reproduction application.

Figure 16:
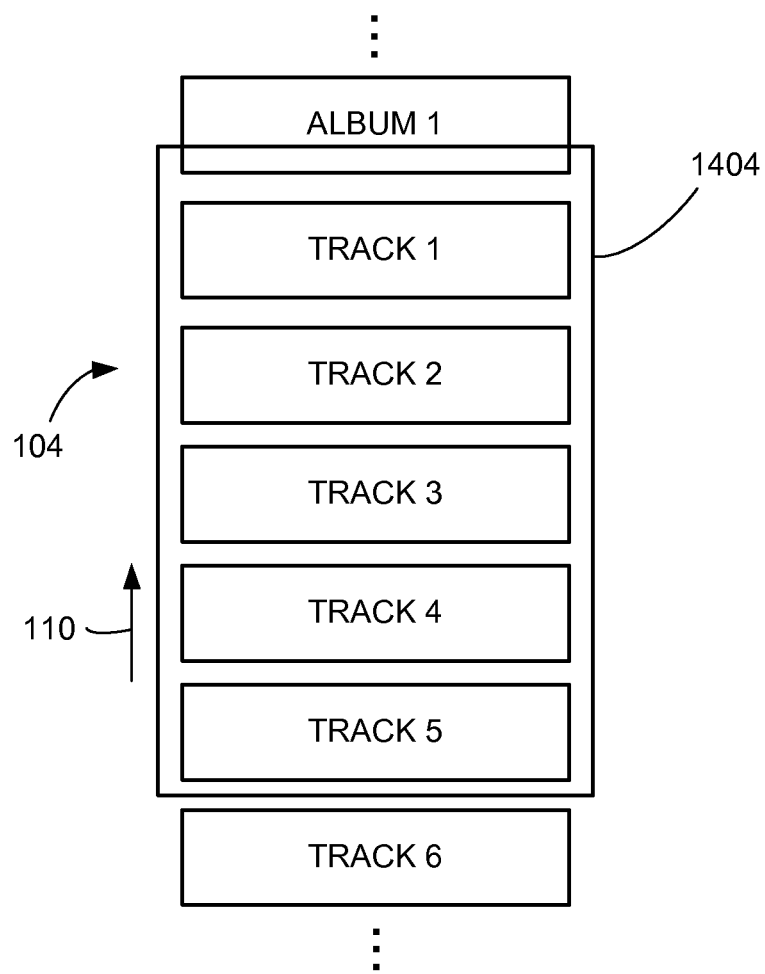
FIG. 16 is a diagram schematically illustrating a configuration of a track selection screen.

Referring now to FIG. 16, therein is shown a diagram schematically illustrating a configuration of a track selection screen. The computing device 302 of FIG. 3 can read out a program of the music reproduction application from the non-volatile memory 304 of FIG. 3 and execute it, to operate the music reproduction application.

If the music reproduction application is operated, the computing device 302 can display a track selection screen 1404 shown in FIG. 16 on the touch screen 104. The track selection screen 1404 is a longitudinally long screen, which is displayed on the entire surface of the touch screen 104 that is longitudinally long in orientation, in consideration of being used in the longitudinal direction 110.

The computing device 302 can display a track list on the track selection screen 1404. The track list is a list in which titles of the tracks (music) stored as music files in the non-volatile memory 304 are longitudinally arranged in tandem, based on title and track number of a recorded album, for example.

Specifically, the track list can be obtained by collecting the tracks for each album arranged in title order and arranging them in track number order. In the track list, the album title can be inserted before (upside on the screen) the title of a leading track for each album, in addition to the title of the track. That is, a title of an album 1, a title of a track number 1 of the album 1, and so on; and a title of a track number 5, a title of an album 2, a title of a track number 1 of the album 2, and so on; can be arranged in the track list.

At least a part of the track list can be displayed on the track selection screen 1404. In fact, FIG. 16 illustrates an example in which five track titles among the titles included in the track list can be displayed on the track selection screen 1404. Here, a scroll of the track list can be controlled using the drag 412 of FIG. 4 in the longitudinal direction 110 on the track selection screen 1404.

Referring now to FIGS. 17A to 17D, therein are shown diagrams schematically illustrating a first manipulation input example through a stretchable cursor in a music reproduction application. As shown in FIG. 17A, it can be assumed that the drag 412 of FIG. 4 is performed in the longitudinal direction 110 on the screen. Then, the computing device 302 of FIG. 3 can determine whether the drag 412 is continuously performed in one direction (upward direction or downward direction) for a predetermined time or longer.

Here, if the drag 412 is performed in one direction for a time shorter than the predetermined time, the computing device 302 can set a scroll mode to a normal scroll mode, and controls the scroll of the track list based on the direction and length of the drag 412 (or flick). That is, at this time, the computing device 302 can perform a normal scroll control with the drag 412. Specifically, the computing device 302 can scroll the track list by the amount based on the length of the drag 412 (or amount based on the speed of the flick) in a reverse direction to the direction of the drag 412 (or flick).

In this respect, it can be assumed that the drag 412 is continuously performed in one direction for the predetermined time or longer. As shown in FIG. 17B, the computing device 302 can set the scroll mode to a stretchable scroll mode, and display the stretchable cursor 402, which stretches from the starting point 404 of FIG. 4 of the drag 412 to the ending point 406 of FIG. 4 thereof in the longitudinal direction 110 on the screen. The stretchable cursor 402 can be continuously displayed until the finger is disengaged from the touch screen 104 and the drag 412 is terminated.

If the stretchable cursor 402 is displayed, the computing device 302 can control the scroll speed 1002 of FIG. 10 (scroll direction and scroll speed value) of the track list based on the direction and the cursor length 410 of FIG. 4 of the stretchable cursor 402 and scroll the track list. Specifically, if the direction of a displayed extendable cursor, depicted as the stretchable cursor 402, is upward, the computing device 302 can set the scroll direction of the track list to the upward direction (that is, direction in which the title moves downward).

Further, on the other hand, if the direction of a displayed extendable cursor, depicted as the stretchable cursor 402, is downward, the computing device 302 can set the scroll direction of the track list to the downward direction (that is, direction in which the title moves upward). Further, as the cursor length 410 becomes long at this time, the scroll speed value can be set to a large value. As a result, for example, if the stretchable cursor 402 stretches long upward by the drag 412 in the upward direction on the screen, the track list displayed on the track selection screen 1404 can be scrolled downward at a high speed.

Further, for example, if the stretchable cursor 402 stretches downwardly in a short distance by the drag 412 in the downward direction on the screen, the track list displayed on the track selection screen 1404 can be slowly scrolled upward. Thereafter, if the drag 412 is terminated, the computing device 302 can move the ending point side of the stretchable cursor 402 close to the starting point side thereof, reduce the stretchable cursor 402, which stretches in the longitudinal direction 110 to a circular shape, and then delete the stretchable cursor 402 from the screen.

Further, it can be assumed that as one title is tapped from among the track titles displayed on the track selection screen 1404, the track can be selected. Then, the computing device 302 can obtain the sound of the track from the music file corresponding to the title of the tapped track, and output the sound through a headphone terminal (not shown).

In this way, in the music reproduction application, if the drag 412 in one direction is continuously performed for a predetermined time or longer, a longitudinal extendable cursor, depicted as the stretchable cursor 402, which connects the starting point 404 of the drag 412 to the ending point 406 thereof, can be displayed on the track selection screen 1404. Further, in the music reproduction application, the scroll direction and scroll speed value of the track list can be set based on the direction (upward or downward) and length of a displayed extendable cursor, depicted as the stretchable cursor 402.

In this way, in the music reproduction application, the user can scroll the track list while freely changing the scroll direction and scroll speed value, only using the manipulation input through the stretchable cursor 402 based on the drag 412 in the longitudinal direction 110. Thus, the user can easily search a desired track title from the track list.

However, in order to change the scroll direction on the track selection screen 1404, the user can firstly disengage the finger and perform the drag 412 in a reverse direction to the previous direction. Otherwise, the user can perform the drag 412 until the direction of the stretchable cursor 402 is reversed by changing the drag 412 direction to the reverse direction without disengaging the finger.

Here, for example, in order to change an upward extendable cursor, depicted as the stretchable cursor 402, to the downward direction, the user can perform the drag 412 until the ending position 508 (C2) of FIG. 5 of the stretchable cursor 402 disposed above the starting position 506 (C1) of FIG. 5 thereof is disposed below the starting position 506 (C1). The drag 412 can be performed by changing the direction of the drag 412 from the upward to the downward. That is, the user can perform the drag 412 until the up and down position relation between the starting position 506 (C1) and the ending position 508 (C2) is reversed. At this time, the computing device 302 can move the ending position 508 (C2) of the stretchable cursor 402 to the direction of the drag 412 (that is, downward direction), and move the starting position 506 (C1) of the stretchable cursor 402 to the reverse direction to the direction of the drag 412 (that is, upward direction).

A basic operation can be the same as the movement when the starting position 506 (C1) of the stretchable cursor 402 moves on the moving image reproduction screen 1202 of FIG. 12. That is, for example, as shown in FIG. 17B, after an upward drag, depicted as the drag 412, is performed on the track selection screen 1404, it can be assumed that the direction of the drag 412 is reversed from the upward to the downward without disengaging the finger.

Further, at this time, it can be assumed that the stretchable cursor 402 steps over a second centerline 1702 (L2), which bisects the track selection screen 1404 up and down. That is, the starting position 506 (C1) of the stretchable cursor 402 and the ending position 508 (C2) thereof divide the track selection screen 1404 into an upper side and a lower side above and below the second centerline 1702 (L2), respectively.

As shown in FIG. 17C, the computing device 302 can move the ending position 508 (C2) of the stretchable cursor 402 in the downward direction, based on a downward drag, depicted as the drag 412, at this time. The computing device 302 can also move the starting position 506 (C1) of the stretchable cursor 402 in the upward direction reverse to the direction of the drag 412.

At this time, the starting position 506 (C1) of the stretchable cursor 402 can move in the upward direction reverse to the direction of the drag 412, differently from the movement of the ending position 508 (C2) until it reaches the second centerline 1702 (L2). However, if it reaches the second centerline 1702 (L2), the starting position 506 (C1) of the stretchable cursor 402 can be fixed to the position and does not move.

If the direction of the drag 412 returns to the original upward direction from the downward direction before the starting position 506 (C1) of the stretchable cursor 402 reaches the second centerline 1702 (L2), the starting position 506 (C1) of the stretchable cursor 402 can move to return to the original position. Here, it can be assumed that the starting position 506 (C1) of the stretchable cursor 402 and the ending position 508 (C2) thereof move in the reverse direction to be close to each other. The direction of the stretchable cursor 402 may not be changed and the length thereof can become short. As a result, the scroll direction of the track list can have a small scroll speed value in the upward direction.

Further, in a certain time, it can be assumed that the ending position 508 (C2) of the stretchable cursor 402 is disposed below the starting position 506 (C1) and the direction of the stretchable cursor 402 is changed from the upward to the downward. Then, the computing device 302 can switch the scroll direction of the track list from the upward to the downward.

As shown in FIG. 17D, if a downward drag, depicted as the drag 412, continues thereafter and the ending position 508 (C2) of the stretchable cursor 402 is disengaged from the starting position 506 (C1) thereof, the cursor length 410 can become long. As a result, the scroll direction of the track list can maintain the downward direction and the scroll speed value of the track list can become large.

In this way, in the music reproduction application, if the direction of the drag 412 is reversed up and down, the ending position 508 (C2) of the stretchable cursor 402 can be moved based on the drag 412 and the starting position 506 (C1) can be moved in a direction reverse to the direction of the drag 412. That is, the ending position 508 (C2) can be moved based on the drag 412, and the starting position 506 (C1) can be moved in a direction reverse to the direction of the ending position 508 (C2).

In this way, compared with a case where the only ending position of the stretchable cursor 402 is moved, the up and down position relation of the starting position 506 (C1) of the stretchable cursor 402 and the ending position 508 (C2) thereof can be reversed. The up and down position relation can be reversed using a small amount of the drag 412 (that is, the movement amount of the finger), to reverse the direction of the stretchable cursor 402. As a result, compared with a case where the only ending position of the stretchable cursor 402 is moved, the scroll direction of the track list can be changed more easily. Further, in this way, since the scroll direction of the track list can be changed by reversing the direction of the stretchable cursor 402 using the small amount of the drag 412, even though the size of the screen is small, a desired manipulability can be obtained.

In addition, in a case where the only ending position of the stretchable cursor 402 is moved, for example, if the drag 412 can be started from a lower edge of the screen and the starting position 506 (C1) can be fixed to the lower edge. Thus, it can be difficult to change the direction of the stretchable cursor 402 and to extend the stretchable cursor 402 in the downward direction after the change.

In the music reproduction application, as the starting position 506 (C1) of the stretchable cursor 402 moves to a direction reverse to the direction of the ending position 508 (C2) thereof, it can be possible to easily change the direction of the stretchable cursor 402 or to further extend the stretchable cursor 402 in the downward direction after the change. It can be possible to easily change the direction even though the drag 412 is started from the lower edge of the screen. Further, it can also be possible to easily change the direction of the stretchable cursor 402, to change the scroll direction of the track list.

It has been discovered that reproduction of the moving image 604 of FIG. 6, the adjustment of the sound volume, and the scroll of the track list is easily performed using the manipulation input through the stretchable cursor 402 based on the drag 412.

Figure 18:
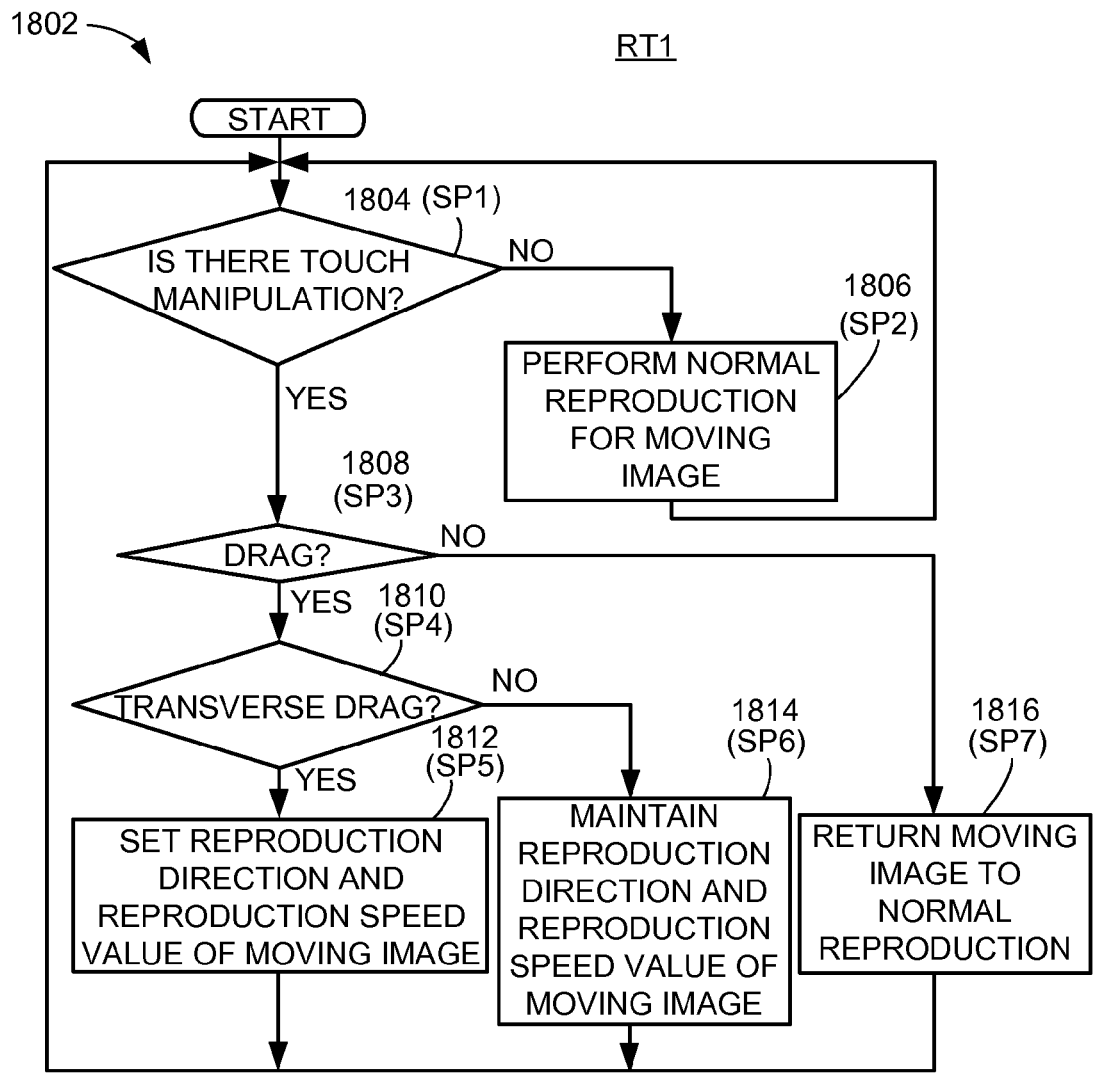
FIG. 18 is a flowchart illustrating a first manipulation input process routine.

Referring now to FIG. 18, therein is shown a flowchart illustrating a first manipulation input process routine 1802. The flowchart depicts the first manipulation input process routine 1802 as a specific process routine performed based on the manipulation input through the stretchable cursor 402 of FIG. 4 by the electronic device system 100 of FIG. 1. The first manipulation input process routine 1802 can be performed in moving image reproduction application.

The first manipulation input process routine 1802 can be performed at the times of the reproduction of the moving image 604 of FIG. 6 and the maintenance of the reproduction speed 602 of FIG. 6. The first manipulation input process routine 1802 (RT1) is a process routine performed by the computing device 302 of FIG. 3 of the electronic device system 100, based on a program of the moving image reproduction application stored in the non-volatile memory 304 of FIG. 3.

If the moving image reproduction application is operated and one of the thumbnails of the moving image 604 displayed as a list is tapped, the computing device 302 can start the first manipulation input process routine 1802 (RT1) and proceed to a first determine manipulation module 1804 (SP1). The first determine manipulation module 1804 (SP1) determines whether a touch manipulation is performed on the touch panel 318 of FIG. 3 *exists* based on an input signal from the touch panel 318.

If a negative result is obtained, the computing device 302 proceeds to a first perform normal reproduction module 1806 (SP2) that reproduces the moving image 604 corresponding to the tapped thumbnail in a forward direction at 1× speed (normal reproduction). Then, the computing device 302 can return to the first determine manipulation module 1804 (SP1).

In this respect, when a positive result is obtained in the first determine manipulation module 1804 (SP1), the computing device 302 can proceed to a first determine drag module 1808 (SP3). The first determine drag module 1808 (SP3) determines whether the touch manipulation is the drag 412 of FIG. 4.

If a positive result is obtained, the computing device 302 can appropriately display the stretchable cursor 402 based on the drag 412 at this time, and then proceed to a first determine transverse drag module 1810 (SP4). The first determine transverse drag module 1810 (SP4) determines whether the drag 412 is a transverse drag, which is the drag 412 performed in the transverse direction 112 of FIG. 1 along the touch screen 104 of FIG. 1.

If a positive result is obtained, this means that the drag 412 is the transverse drag. At this time, the computing device 302 proceeds to a first set reproduction module 1812 (SP5), which sets reproduction parameters, including reproduction direction and reproduction speed values, of the moving image 604 based on the cursor length 410 of FIG. 4 and the cursor direction 408 of FIG. 4 of a displayed extendable cursor, depicted as the stretchable cursor 402. The first set reproduction module 1812 (SP5) performs a portion of the first manipulation input process routine 1802. Then, the computing device 302 can return to the first determine manipulation module 1804 (SP1).

In this respect, if a negative result is obtained in the first determine transverse drag module 1810 (SP4), this means that the drag 412 is a longitudinal drag, depicted as the drag 412. That is, the paste manipulation is performed. Then, the computing device 302 can proceed to a first maintain reproduction module 1814 (SP6). The first maintain reproduction module 1814 (SP6) maintains the reproduction direction and reproduction speed value of the moving image 604 at this time. Then, the computing device 302 can return to the first determine manipulation module 1804 (SP1).

Further, on the other hand, if a negative result is obtained in the first determine drag module 1808 (SP3), this means that the touch manipulation is a tap. Then, the computing device 302 can proceed to a first return reproduction module 1816 (SP7), which returns the reproduction speed 602 of the moving image 604 to an initial value (forward direction, 1× speed) to normally reproduce the moving image 604. Then, the computing device 302 can return to the first determine manipulation module 1804 (SP1).

Based on the first manipulation input process routine 1802 (RT1), the computing device 302 can reproduce the moving image 604 and can maintain the reproduction speed 602 based on the manipulation input through the stretchable cursor 402 based on the drag 412.

It has been discovered that the first manipulation input process routine 1802 (RT1) provides improved efficiency with the first manipulation input process routine 1802 (RT1) performed based on the cursor length 410 and the cursor direction 408 with the first set reproduction module 1812 (SP5) since the first manipulation input process routine 1802

(RT1) can automatically continue after the stretchable cursor 402 is pasted with the drag 412 performed on the touch screen 104.

Figure 19:
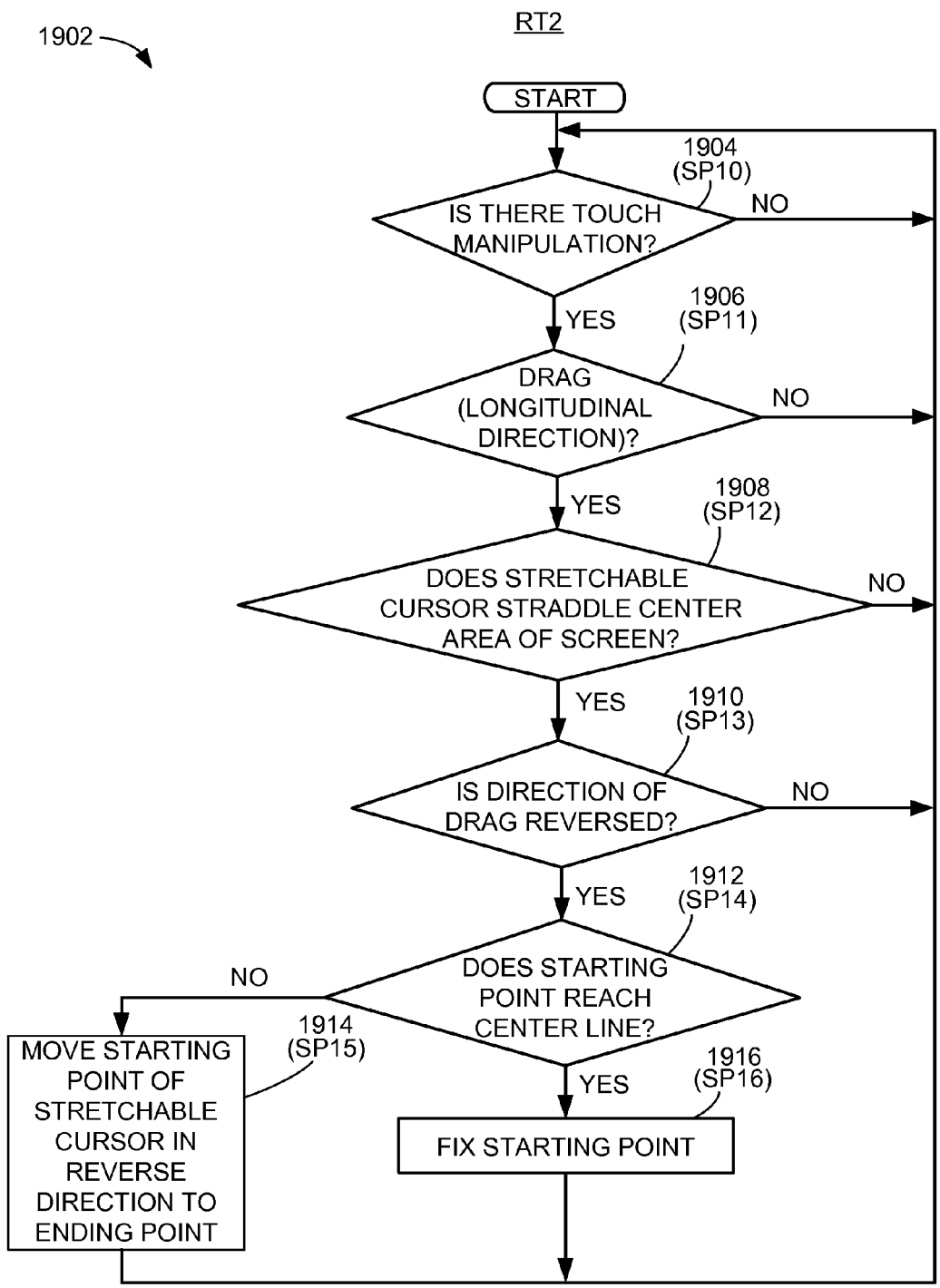
FIG. 19 is a flowchart illustrating a second manipulation input process routine.

Referring now to FIG. 19, therein is shown a flowchart illustrating a second manipulation input process routine 1902. Subsequently, in the moving image reproduction application, the manipulation input process routine at the time when the adjustment of the sound volume and the movement of the starting position 506 (C1) of FIG. 5 of the stretchable cursor 402 of FIG. 4 can be performed as shown in FIG. 19. The second manipulation input process routine 1902 (RT2) is also a process routine performed by the computing device 302 of FIG. 3 of the electronic device system 100 of FIG. 1, based on a program of the moving image reproduction application stored in the non-volatile memory 304 of FIG. 3.

If the moving image reproduction application is operated and one of the thumbnails of the moving image 604 of FIG. 6 displayed as a list is tapped, the computing device 302 can start the second manipulation input process routine 1902 (RT2) and proceed to a first determine manipulation module 1904 (SP10). The first determine manipulation module 1904 (SP10) determines whether the touch manipulation on the touch panel 318 of FIG. 3 exists based on the input signal from the touch panel 318.

In the first determine manipulation module 1904 (SP10), the computing device 302 can wait until a positive result is obtained. If the positive result is obtained, the computing device 302 can proceed to a first determine drag module 1906 (SP11), which determines whether the touch manipulation is a longitudinal drag, depicted as the drag 412 of FIG. 4, on the screen. In the first determine drag module 1906 (SP11), the computing device 302 can appropriately display the stretchable cursor 402 based on the touch manipulation at this time.

If a negative result is obtained in the first determine drag module 1906 (SP11), the computing device 302 can return to the first determine manipulation module 1904 (SP10). In this respect, if a positive result is obtained in the first determine drag module 1906 (SP11), the computing device 302 can set the adjustment direction of the sound volume and the adjustment speed value thereof based on the direction and the cursor length 410 of FIG. 4 of the stretchable cursor 402. Then, the computing device 302 can proceed to a first determine straddle center module 1908 (SP12).

The first determine straddle center module 1908 (SP12) determines whether the stretchable cursor 402 displayed steps over the center of the screen. That is, the first determine straddle center module 1908 (SP12) can determine whether the stretchable cursor 402 steps over the first centerline 1502 (L1) of FIG. 15. If a negative result is obtained in the first determine straddle center module 1908 (SP12), the computing device 302 can return to the first determine manipulation module 1904 (SP10). In this respect, if a positive result is obtained in the first determine straddle center module 1908 (SP12), the computing device 302 can proceed to a first determine reverse drag module 1910 (SP13).

The first determine reverse drag module 1910 (SP13) determines whether the direction of the drag 412 is reversed. If a negative result is obtained in the first determine reverse drag module 1910 (SP13), the computing device 302 can return to the first determine manipulation module 1904 (SP10). In this respect, if a positive result is obtained in the first determine reverse drag module 1910 (SP13), this means that the direction of the drag 412 is reversed. That is, the direction of the drag 412 is a reverse direction to the direction at the time when the drag 412 is started. Then, the computing device 302 can proceed to a first determine starting point module 1912 (SP14).

The first determine starting point module 1912 (SP14) determines whether the starting position 506 (C1) of the stretchable cursor 402 reaches the first centerline 1502 (L1). If a negative result is obtained in the first determine starting point module 1912 (SP14), the computing device 302 can proceed to a first move starting point module 1914 (SP15).

The first move starting point module 1914 (SP15) moves the starting position 506 (C1) in a reverse direction to the direction of the ending position 508 (C2) of FIG. 5 of the stretchable cursor 402. Then, the computing device 302 can return to the first determine manipulation module 1904 (SP10).

In this respect, if a positive result is obtained in the first determine starting point module 1912 (SP14), the computing device 302 can proceed to a first fix starting point module 1916 (SP16). The first fix starting point module 1916 (SP16) fixes the position of the starting position 506 (C1) of the stretchable cursor 402 to a current position on the first centerline 1502 (L1). Then, the computing device 302 can return to the first determine manipulation module 1904 (SP10).

Based on the second manipulation input process routine 1902 (RT2), the computing device 302 can adjust the sound volume and move the starting position 506 (C1) of the stretchable cursor 402 based on the manipulation input through the stretchable cursor 402 based on the drag 412.

Figure 20:
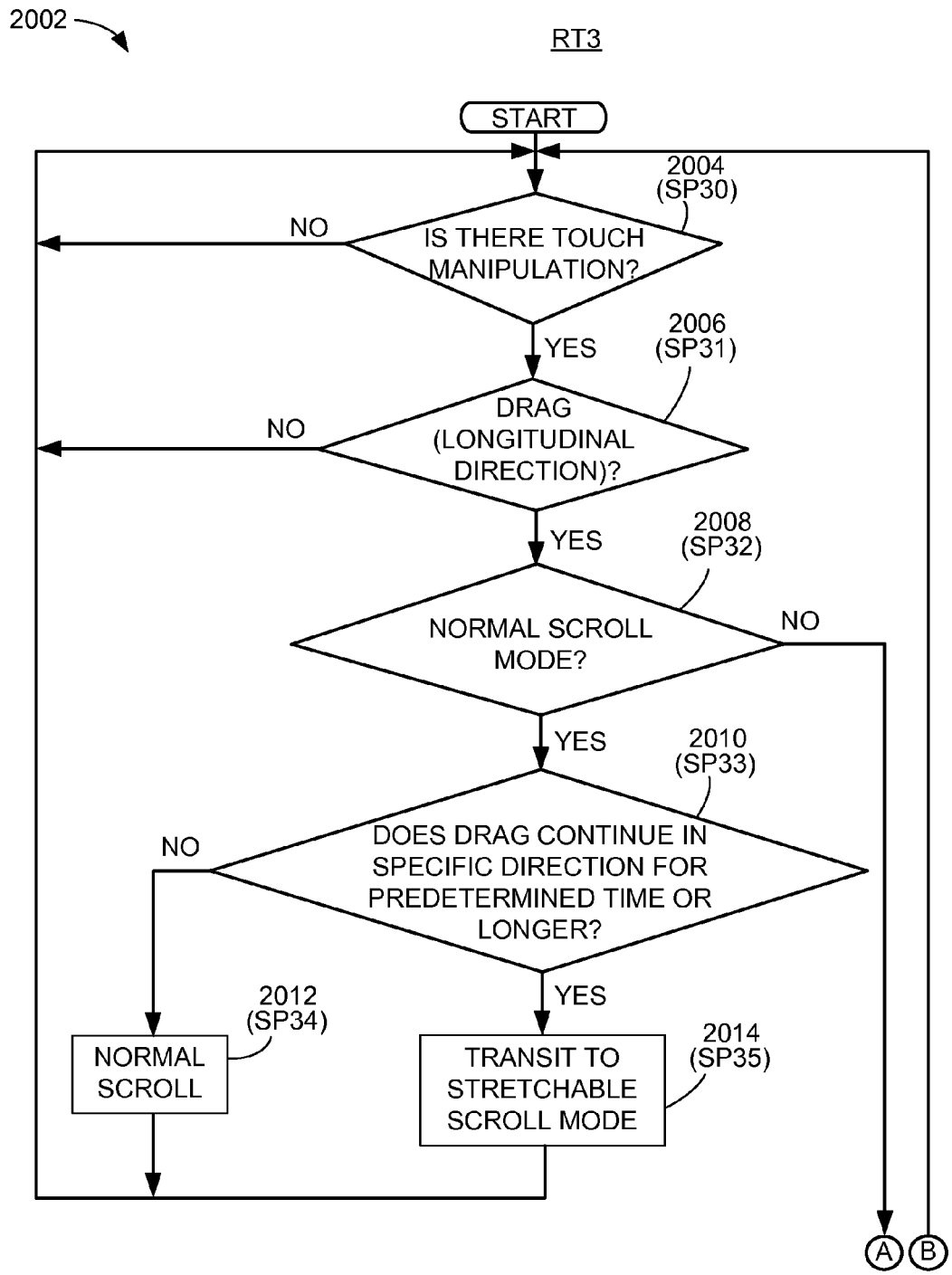
FIG. 20 is a flowchart illustrating a third manipulation input process routine.

Referring now to FIG. 20, therein is shown a flowchart illustrating a third manipulation input process routine 2002. The third manipulation input process routine 2002 can be performed at the time when the track list is scrolled and the starting position 506 (C1) of FIG. 5 of the stretchable cursor 402 of FIG. 4 is moved in the music reproduction application as shown in FIG. 20.

The third manipulation input process routine 2002 (RT3) is a process routine performed by the computing device 302 of FIG. 3 of the electronic device system 100 of FIG. 1, based on a program of the music reproduction application stored in the non-volatile memory 304 of FIG. 3.

If the music reproduction application is operated, the computing device 302 can display the track list on the track selection screen 1404 of FIG. 14, start the third manipulation input process routine 2002 (RT3), and then proceed to a first determine manipulation module 2004 (SP30). The first determine manipulation module 2004 (SP30) determines whether the touch manipulation on the touch panel 318 of FIG. 3 exists based on the input signal from the touch panel 318. In the first determine manipulation module 2004 (SP30), the computing device 302 can wait until a positive result is obtained. If the positive result is obtained, the computing device 302 can proceed to a first determine drag module 2006 (SP31).

The first determine drag module 2006 (SP31) determines whether the touch manipulation is a longitudinal drag, depicted as the drag 412 of FIG. 4, on the screen. If a negative result is obtained in the first determine drag module 2006 (SP31), the computing device 302 can return to the first determine manipulation module 2004 (SP30) again. In this respect, if a positive result is obtained in the first determine drag module 2006 (SP31), the computing device 302 can proceed to a first determine normal scroll module 2008 (SP32).

The first determine normal scroll module 2008 (SP32) determines whether a current scroll mode is a normal scroll mode. If a positive result is obtained in the first determine normal scroll module 2008 (SP32), the computing device 302 can proceed to a first determine drag continue module 2010 (SP33). The first determine drag continue module 2010 (SP33) determines whether the drag 412 is continuously performed in one direction for a predetermined time or longer. Here, if a negative result is obtained, the computing device 302 can proceed to a first perform normal scroll module 2012 (SP34), which scrolls the track list based on the direction and length of the drag 412 at this time. Then, the computing device 302 can return to the first determine manipulation module 2004 (SP30).

In this respect, if a positive result is obtained in the first determine drag continue module 2010 (SP33), this means that the drag 412 is continuously performed in one direction for the predetermined time or longer. Then, the computing device 302 can proceed to a first transit stretchable scroll module 2014 (SP35).

The first transit stretchable scroll module 2014 (SP35) transits the scroll mode to a stretchable scroll mode, and displays the stretchable cursor 402 based on the drag 412 at this time. Further, the first transit stretchable scroll module 2014 (SP35) can set the scroll direction and the scroll speed value of the track list based on the direction and length of a displayed extendable cursor, depicted as the stretchable cursor 402. Then, the computing device 302 can return to the first determine manipulation module 2004 (SP30).

Figure 21:
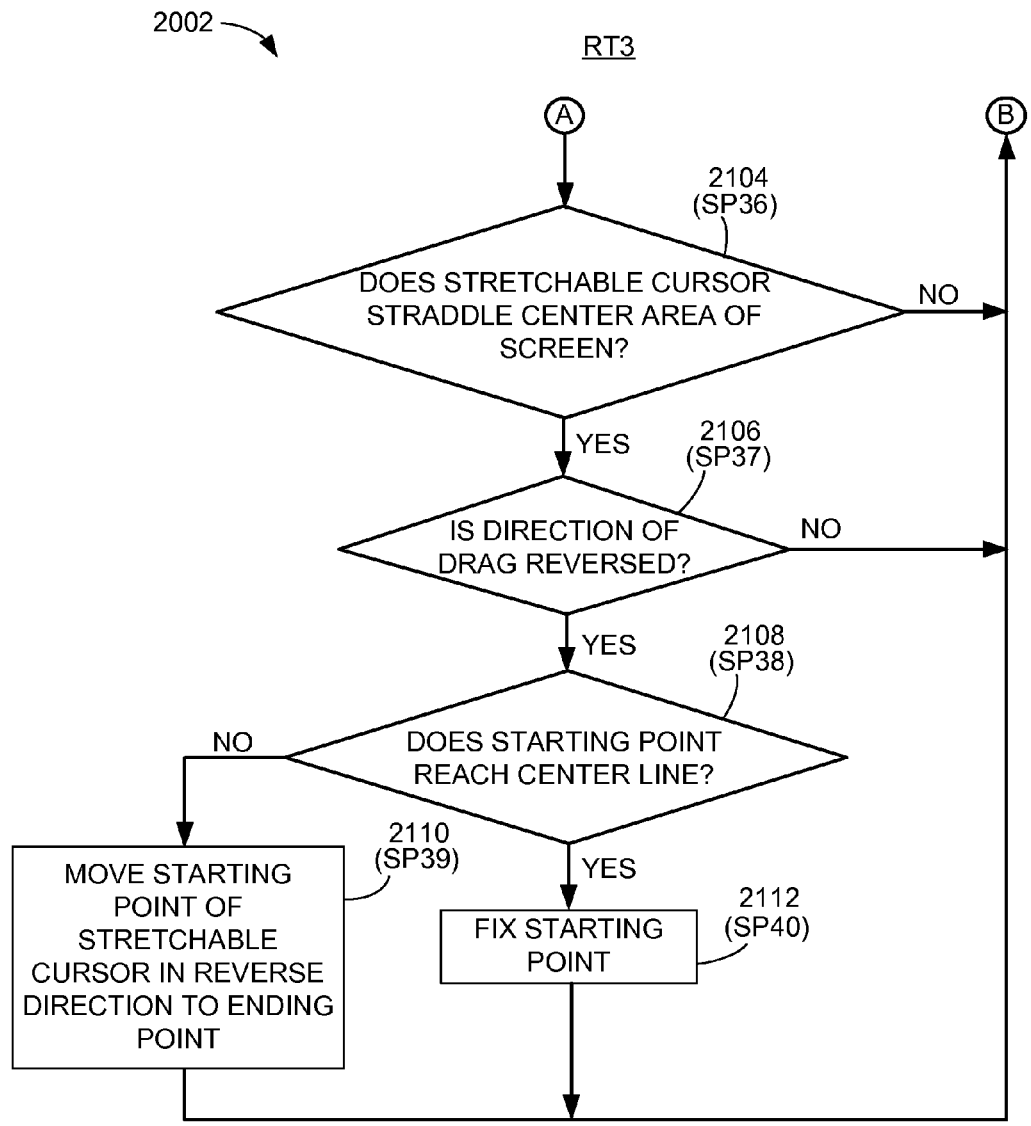
FIG. 21 is a flowchart subsequent to the flowchart indicating the third manipulation input process routine in FIG. 20.

Referring now to FIG. 21, therein is shown a flowchart subsequent to the flowchart indicating the third manipulation input process routine 2002 in FIG. 20. If a negative result is obtained in the first determine normal scroll module 2008 (SP32) of FIG. 20, this means that the current scroll mode is the stretchable scroll mode. Then, the computing device 302 of FIG. 3 can proceed to a first determine straddle center module 2104 (SP36).

The first determine straddle center module 2104 (SP36) determines whether a displayed extendable cursor, depicted as the stretchable cursor 402 of FIG. 4, steps over the center of the screen. That is, the first determine straddle center module 2104 (SP36) determines whether a displayed extendable cursor, depicted as the stretchable cursor 402, steps over the first centerline 1502 (L1) of FIG. 15. If a negative result is obtained in the first determine straddle center module 2104 (SP36), the computing device 302 can return to the first determine manipulation module 2004 (SP30) of FIG. 20. In this respect, if a positive result is obtained in the first determine straddle center module 2104 (SP36), the computing device 302 can proceed to a first determine drag module 2106 (SP37).

The first determine drag module 2106 (SP37) determines whether the direction of the drag 412 of FIG. 4 is reversed. If a negative result is obtained in the first determine drag module 2106 (SP37), the computing device 302 can return to the first determine manipulation module 2004 (SP30). In this respect, if a positive result is obtained in the first determine drag module 2106 (SP37), this means that the direction of the drag 412 is reversed. That is, the direction of the drag 412 is a reverse direction to the direction at the time when the drag 412 is started. Then, the computing device 302 can proceed to a first determine starting point module 2108 (SP38).

Figure 17:
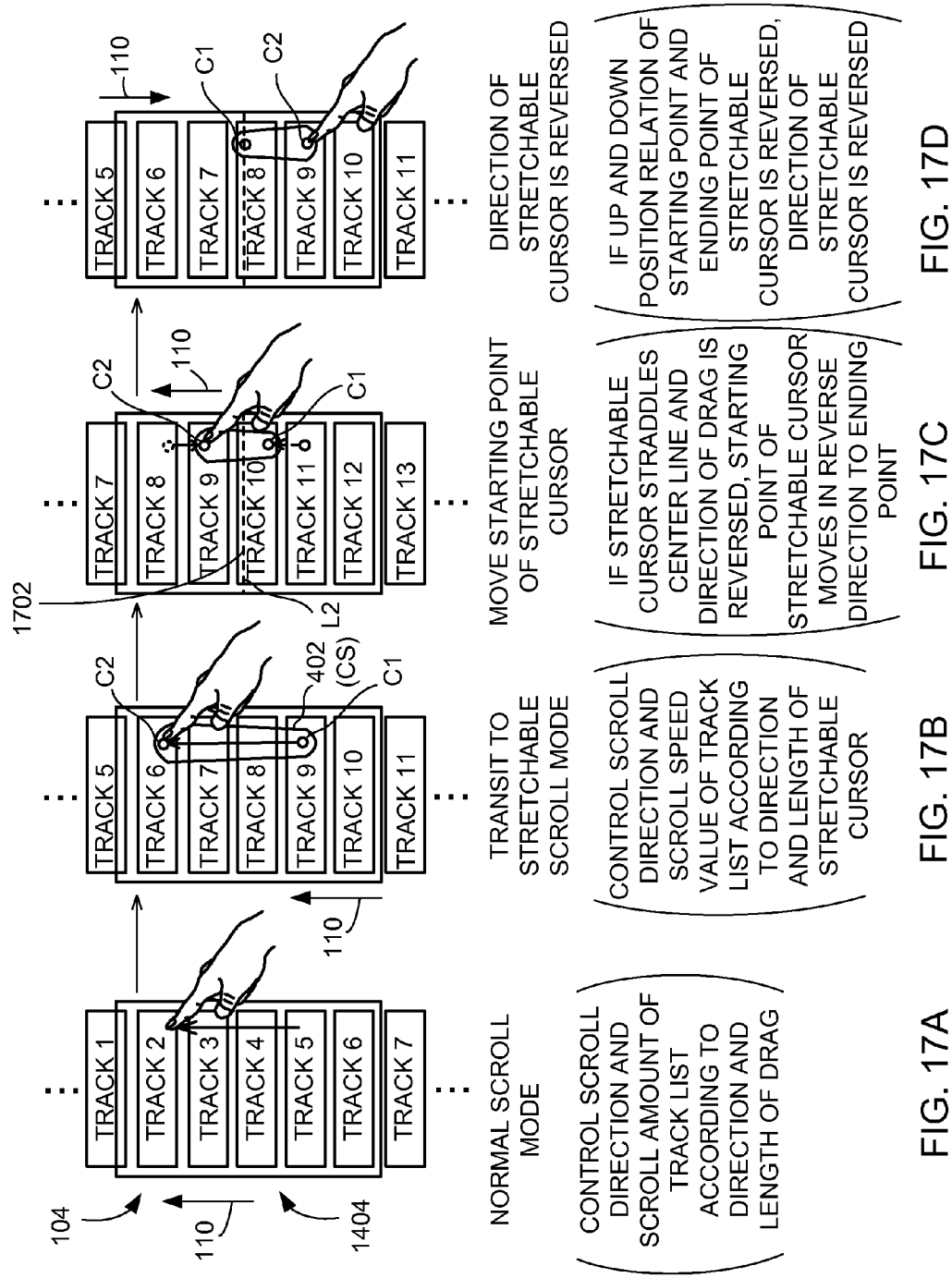
FIGS. 17A to 17D are diagrams schematically illustrating a first manipulation input example through a stretchable cursor in a music reproduction application.

The first determine starting point module 2108 (SP38) determines whether the starting position 506 (C1) of FIG. 5 of the stretchable cursor 402 reaches the second centerline 1702 (L2) of FIG. 17. If a negative result is obtained in the first determine starting point module 2108 (SP38), the computing device 302 can proceed to a move starting point module 2110 (SP39).

The move starting point module 2110 (SP39) moves the starting position 506 (C1) of the stretchable cursor 402 to a reverse direction to the direction of the ending position 508 (C2) of FIG. 5 thereof. Then, the computing device 302 can return to the first determine manipulation module 2004 (SP30).

In this respect, if a positive result is obtained in the first determine starting point module 2108 (SP38), the computing device 302 can proceed to a first fix starting point module 2112 (SP40). The first fix starting point module 2112 (SP40) fixes the position of the starting position 506 (C1) of the stretchable cursor 402 to a current position on the second centerline 1702 (L2). Then, the computing device 302 can return to the first determine manipulation module 2004 (SP30).

Based on the third manipulation input process routine 2002 (RT3), the computing device 302 can scroll the track list and move the starting position 506 (C1) of the stretchable cursor 402 based on the manipulation input through the stretchable cursor 402 based on the drag 412.

In the above-described configuration, the computing device 302 of the electronic device system 100 of FIG. 1 can operate the moving image reproduction application and then display a transverse extendable cursor, depicted as the stretchable cursor 402, in the moving image reproduction screen 1202 of FIG. 12, based on the drag 412 in the transverse direction 112 of FIG. 1. Further, the computing device 302 can reproduce the moving image 604 of FIG. 6 while setting the reproduction direction and the reproduction speed value, based on the direction (leftward or rightward) of a displayed extendable cursor, depicted as the stretchable cursor 402, and the length thereof. In this way, the electronic device system 100 can reproduce the moving image 604 by setting the reproduction direction and the reproduction speed value of the moving image 604, using only the manipulation input through the stretchable cursor 402 based on the transverse drag.

Further, if a paste manipulation for bending the direction of the drag 412 at a right angle is performed for a displayed extendable cursor, depicted as the stretchable cursor 402, the computing device 302 can maintain the reproduction speed 602 of FIG. 6 (reproduction direction and reproduction speed value) right before the paste manipulation is performed after the paste manipulation, to continue the reproduction of the moving image 604. In this way, the electronic device system 100 can continue to reproduce at the reproduction speed 602 set by the manipulation input through the stretchable cursor 402 through the paste manipulation after the finger is disengaged.

Further, the computing device 302 of the electronic device system 100 can display a longitudinal extendable cursor, depicted as the stretchable cursor 402, on the moving image reproduction screen 1202 based on a longitudinal drag, depicted as the drag 412. Further, the computing device 302 can set the adjustment direction of the sound volume (increasing or decreasing direction) and the adjustment speed value (increasing or decreasing speed), based on the direction (upward or downward) and length of a displayed extendable cursor, depicted as the stretchable cursor 402. In this way, the electronic device system 100 can adjust the sound volume while changing the adjustment direction and the adjustment speed value, using only the manipulation input through the stretchable cursor 402 based on a longitudinal drag, depicted as the drag 412.

Further, at this time, if the direction of the drag 412 is reversed up and down, the computing device 302 can move the ending position 508 (C2) of the stretchable cursor 402 based on the drag 412, and move the starting position 506 (C1) in a reverse direction to the drag 412. That is, the computing device 302 can move the ending position 508 (C2) based on the drag 412, and move the starting position 506 (C1) in a reverse direction to the direction of the ending position 508 (C2).

In this way, the electronic device system 100 can reverse the direction of the stretchable cursor 402 while reversely changing the up and down position relation of the starting position 506 (C1) of the stretchable cursor 402 and the ending position 508 (C2) thereof, using a small amount of the drag 412, compared with a case where the only ending position of the stretchable cursor 402 is moved.

Further, since the starting position 506 (C1) of the stretchable cursor 402 is moved in a reverse direction to the direction of the drag 412, even though the drag 412 is started from an edge of the screen, the direction of the stretchable cursor 402 can be easily reversed. As a result, compared with a case where the only ending position of the stretchable cursor 402 is moved, the adjustment direction of the sound amount can be more rapidly and easily changed.

Further, after the music reproduction application is operated, the computing device 302 of the electronic device system 100 can display a longitudinal extendable cursor, depicted as the stretchable cursor 402, on the track selection screen 1404 of FIG. 14 based on a longitudinal drag, depicted as the drag 412.

Further, the computing device 302 can set the scroll direction of the track list and the scroll speed 1002 of FIG. 10 value, based on the direction (upward or downward) and length of a displayed extendable cursor, depicted as the stretchable cursor 402. In this way, the electronic device system 100 can scroll the track list while changing the scroll direction and the scroll speed value, using only the manipulation input through the stretchable cursor 402 based on a longitudinal drag, depicted as the drag 412.

Further, at this time, if the direction of the drag 412 is reversed up and down, the computing device 302 can move the ending position 508 (C2) of the stretchable cursor 402 based on the drag 412, and move the starting position 506 (C1) in a reverse direction to the drag 412. In this way, the electronic device system 100 can reverse the direction of the stretchable cursor 402 while reversely changing the up and down position relation of the starting position 506 (C1) of the stretchable cursor 402 and the ending position 508 (C2) thereof, using a small amount of the drag 412, compared with a case where the only ending position of the stretchable cursor 402 is moved.

Further, since the starting position 506 (C1) of the stretchable cursor 402 is moved in a reverse direction to the direction of the drag 412, even though the drag 412 is started from an edge of the screen, the direction of the stretchable cursor 402 can be easily reversed. As a result, compared with a case where the only ending position of the stretchable cursor 402 is moved, the scroll direction of the track list can be more rapidly and easily changed.

Figure 22:
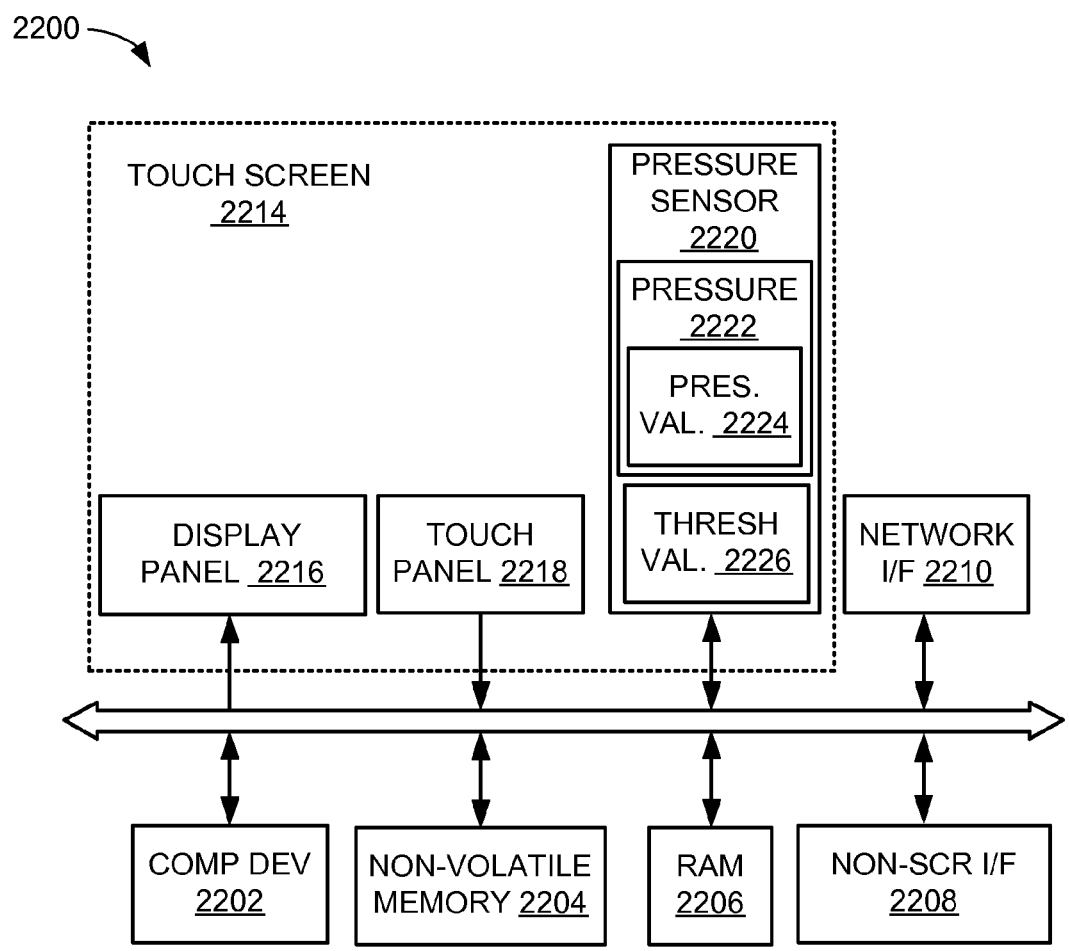
FIG. 22 is an exemplary hardware block diagram of an electronic device system with a process continuation mechanism in a second embodiment of the present invention.

Referring now to FIG. 22, therein is shown an exemplary hardware block diagram of an electronic device system 2200 with a process continuation mechanism in a second embodiment of the present invention. In a manner similar to the electronic device system 100 of FIG. 1, the electronic device system 2200 can include a computing device 2202, a non-volatile memory 2204, a random access memory 2206, a non-screen interface 2208, a network interface 2210, a touch screen 2214, a display panel 2216, and a touch panel 2218.

The electronic device system 2200 can also include a pressure sensor 2220 to detect or sense a pressure 2222 applied to or on the touch screen 2214. The pressure 2222 generated when the touch screen 2214 is pressed with a finger or the like can be sensed using the pressure sensor 2220. Then, it can be determined that the press manipulation for the touch screen 2214 is performed based on the pressure 2222.

The pressure sensor 2220 can be arranged between or communicate to the touch panel 2218 and the display panel 2216 based on the pressure 2222 on the touch screen 2214. Also for example, the pressure sensor 2220 can be arranged in or part of the touch panel 2218 and communicate to the display panel 2216.

The pressure sensor 2220 can output or generate the pressure 2222 having a pressure value 2224. The pressure value 2224 is a numerical value of the pressure 2222 indicating a quantitative amount of an applied force per unit area. For example, the pressure value 2224 can include an approximate range of 0 to 255.

The computing device 2202 can monitor the pressure value 2224 obtained from the pressure sensor 2220. If the pressure value 2224 exceeds a threshold value 2226, the computing device 2202 can determine or detect that the touch screen 2214 is pressed by the finger or the like, and receive it as a manipulation input. The threshold value 2226 is a numerical value above which the pressure sensor 2220 detects and determines that a force is applied.

In a manner similar to the electronic device system 100, the electronic device system 2200 can include the manipulation module 202 of FIG. 2, the display module 204 of FIG. 2, the control module 206 of FIG. 2, and the press-sensing module 208 of FIG. 2. As an example, the touch panel 2218 can represent a specific hardware example of the manipulation module 202. As another example, the pressure sensor 2220 can represent a specific hardware example of the press-sensing module 208. As a further example, the display panel 2216 can represent a specific hardware example of the display module 204. As a further example, the computing device 2202 can represent a specific hardware example of the control module 206.

The manipulation input can be performed through pressing of the touch screen 2214. The electronic device system 2200 can use the pressing of the touch screen 2214 as the paste manipulation for the stretchable cursor 402 of FIG. 4.

That is, if the touch screen 2214 is pressed in a state where the stretchable cursor 402 is displayed by the transverse drag on the screen in the moving image reproduction application, the computing device 2202 can recognize it as the paste manipulation, and maintain the reproduction speed 602 of FIG. 6 at this time.

Figure 23:
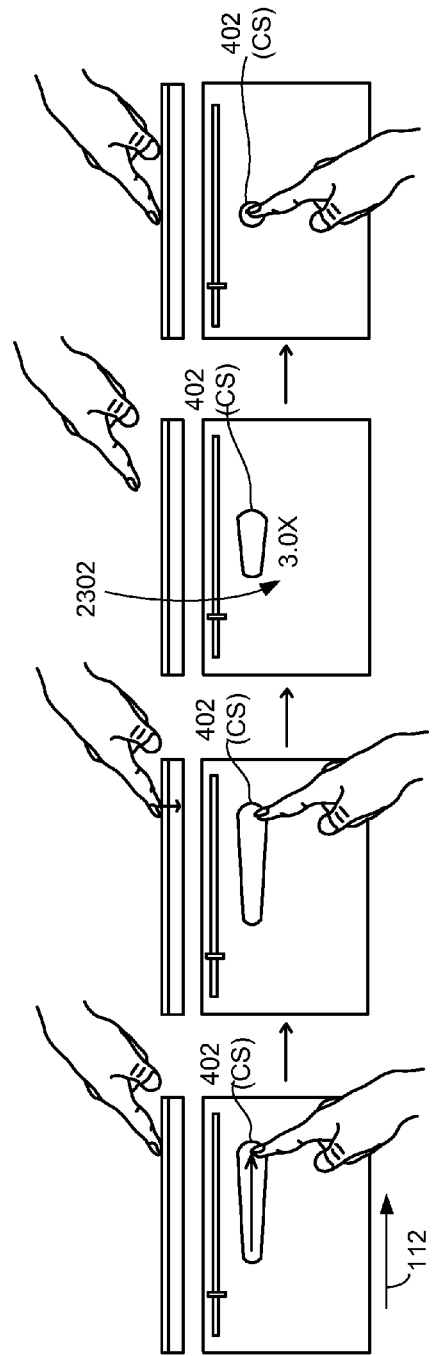
FIGS. 23A to 23D are diagrams schematically illustrating a manipulation input example through the stretchable cursor in a moving image reproduction application based on the second embodiment of the present invention.

Referring now to FIGS. 23A to 23D, therein are shown diagrams schematically illustrating a manipulation input example through the stretchable cursor 402 in a moving image reproduction application based on the second embodiment of the present invention. As shown in FIG. 23A, it can be assumed that the transverse drag is performed on the screen, on the moving image reproduction screen 1202 of FIG. 12. Then, the computing device 2202 of FIG. 22 can display the stretchable cursor 402, which stretches from the starting point 404 of FIG. 4 of the drag 412 of FIG. 4 to the ending point 406 of FIG. 4 thereof in the transverse direction 112, on the screen, based on the drag 412.

If the computing device 2202 recognizes that the direction of a displayed extendable cursor, depicted as the stretchable cursor 402, is transverse, the computing device 2202 can control the reproduction speed 602 of FIG. 6 (reproduction direction and reproduction speed value) of the moving image 604 of FIG. 6 displayed on the screen, based on the direction and the cursor length 410 of FIG. 4 of the stretchable cursor 402.

Specifically, if the direction of a displayed extendable cursor, depicted as the stretchable cursor 402, is rightward, the computing device 2202 can set a sign of the reproduction speed 602 to be negative, and set the reproduction direction in a forward direction. Further, on the other hand, if the direction of a displayed extendable cursor, depicted as the stretchable cursor 402, is leftward, the computing device 2202 can set a sign of the reproduction speed 602 to be positive, and set the reproduction direction in a reverse direction. Further, as the cursor length 410 becomes long, the reproduction speed value can be set to a large value. In this way, the moving image reproduction screen 1202 can reproduce the moving image 604 at a desired level for the reproduction speed 602, through the manipulation input through the stretchable cursor 402.

As shown in FIG. 23B, on the moving image reproduction screen 1202, as the touch screen 2214 of FIG. 22 is pressed after the drag 412 is performed in the transverse direction 112 on the screen, even though the finger is disengaged thereafter, the reproduction speed 602 (reproduction direction and reproduction speed value) can be maintained.

Since the movement of the finger is a movement for pasting the ending point portion of the stretchable cursor 402 on the screen, the pressing of the touch screen 2214 can be referred to as a paste manipulation. As shown in FIG. 23B, it can be assumed that the touch screen 2214 is pressed in a state where the stretchable cursor 402 is displayed by the drag 412 in the transverse on the screen, and thus the paste manipulation can be performed for the stretchable cursor 402. Then, based on the paste manipulation, the computing device 2202 can maintain the reproduction direction and the reproduction speed value set based on the direction and the cursor length 410 of the stretchable cursor 402 at this time, after the paste manipulation.

That is, the computing device 2202 can maintain the reproduction speed 602 (reproduction direction and reproduction speed value) set right before the paste manipulation is performed after the paste manipulation, after the finger is disengaged. As a result, on the moving image reproduction screen 1202, the moving image 604 can be continuously reproduced at the reproduction speed 602 (reproduction direction and reproduction speed value) set right before the finger is disengaged even after the finger is disengaged.

As shown in FIG. 23C, the computing device 2202 can display reproduction speed information 2302 indicating the reproduction speed 602 around the stretchable cursor 402, reduce the stretchable cursor 402 to a circular shape, and then delete the stretchable cursor 402 from the screen. That is, on the moving image reproduction screen 1202 after the paste manipulation, the moving image 604, which is continuously reproduced at the reproduction speed 602 set right before the paste manipulation and the reproduction speed information 2302 indicating the reproduction speed 602, can be displayed.

As shown in FIG. 23D, if the touch screen 2214 is tapped, the computing device 2202 can return the reproduction speed 602 to the initial value (forward direction, 1× speed). Thus, the moving image 604 displayed on the moving image reproduction screen 1202 can be normally reproduced.

In this way, on the moving image reproduction screen 1202, the paste manipulation for a displayed extendable cursor, depicted as the stretchable cursor 402, can be performed, the reproduction speed 602 right before the paste manipulation is performed can be maintained after the paste manipulation. In this way, on the moving image reproduction screen 1202, the moving image 604 can be continuously reproduced at a desired level of the reproduction speed 602 even though the finger is disengaged thereafter.

Further, by performing the paste manipulation by pressing in a depth direction on the screen, not by a longitudinal drag, depicted as the drag 412, on the screen in the first embodiment, the paste manipulation can be performed without moving the ending point 406 of the drag 412. Accordingly, it can be possible to prevent the reproduction speed 602 from being changed based on the paste manipulation, and to easily and reliably maintain the reproduction speed 602 desired by the user.

Figure 24:
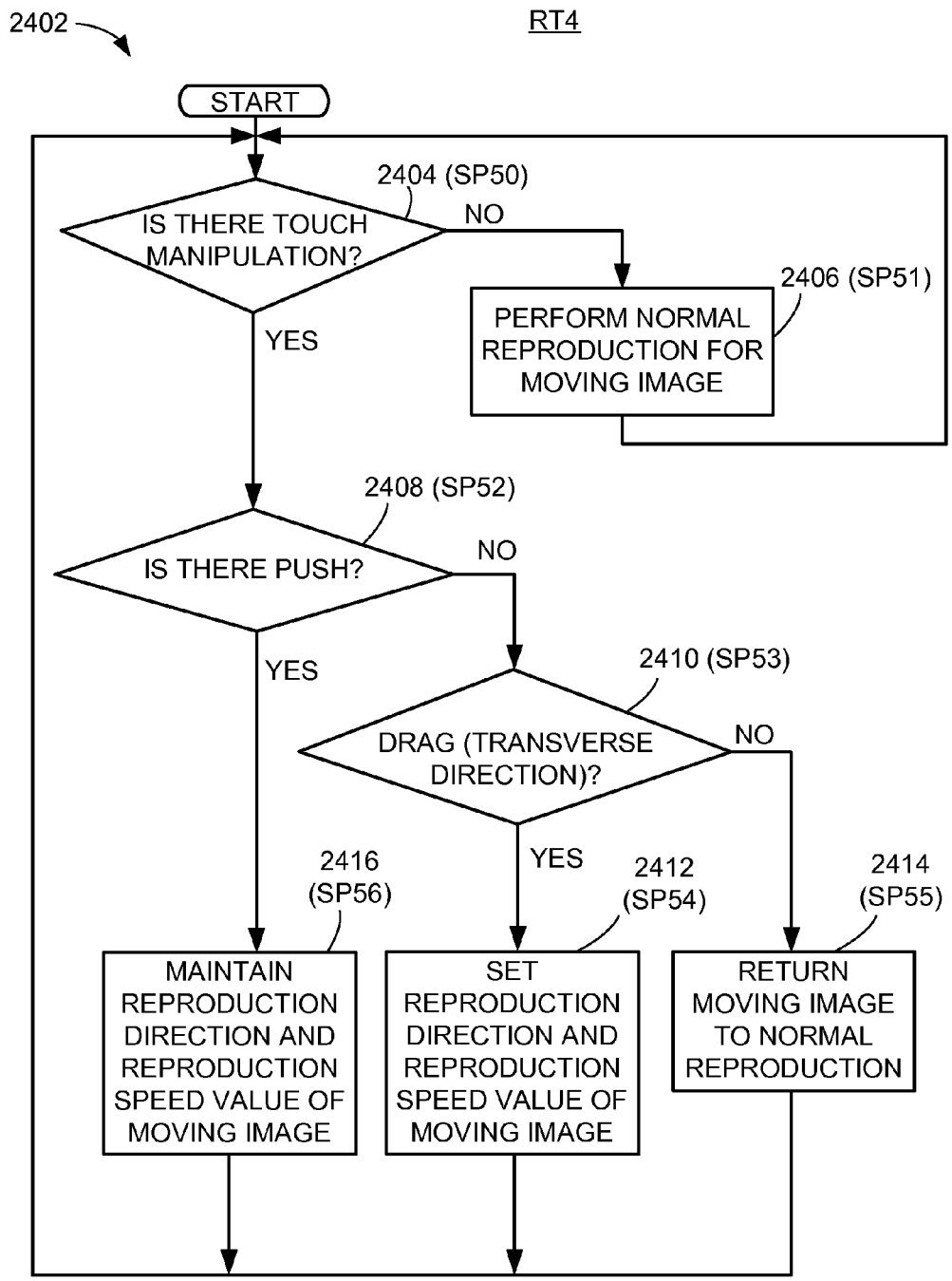
FIG. 24 is a flowchart illustrating a manipulation input process routine based on the second embodiment of the present invention.

Referring now to FIG. 24, therein is shown a flowchart illustrating a manipulation input process routine 2402 based on the second embodiment of the present invention. The flowchart includes the manipulation input process routine 2402 performed when the electronic device system 2200 of FIG. 22 reproduces the moving image 604 of FIG. 6 and maintains the reproduction speed 602 of FIG. 6 in the moving image reproduction application.

The manipulation input process routine 2402 (RT4) shown in FIG. 24 is a process routine performed by the computing device 2202 of FIG. 22, based on a program of the moving image reproduction application stored in the non-volatile memory 2204 of FIG. 22. If the moving image reproduction application is operated and one of the thumbnails of the moving image 604 displayed as a list is tapped, the computing device 2202 can start the manipulation input process routine 2402 (RT4) and proceed to a second determine manipulation module 2404 (SP50).

The second determine manipulation module 2404 (SP50) determines whether a touch manipulation on the touch panel 2218 of FIG. 22 exists based on an input signal from the touch panel 2218. Here, if a negative result is obtained, the computing device 2202 can proceed to a second perform reproduction module 2406 (SP51), which reproduces the moving image 604 corresponding to the tapped thumbnail in a forward direction at 1× speed (normal reproduction). Then, the computing device 2202 can return to the second determine manipulation module 2404 (SP50). In this respect, when a positive result is obtained in the second determine manipulation module 2404 (SP50), the computing device 2202 can proceed to a determine push module 2408 (SP52).

The determine push module 2408 (SP52) determines whether the pressing on the touch screen 2214 of FIG. 22 exists, based on the pressure value 2224 of FIG. 22 from the pressure sensor 2220 of FIG. 22. If a negative result is obtained in the determine push module 2408 (SP52), the computing device 2202 can proceed to a second determine transverse drag module 2410 (SP53), which determines whether the touch manipulation is the transverse drag. Here, if a positive result is obtained, the computing device 2202 can appropriately display the stretchable cursor 402 of FIG. 4 based on the drag 412 of FIG. 4 at this time, and then proceed to a second set reproduction module 2412 (SP54).

The second set reproduction module 2412 (SP54) sets the reproduction direction and reproduction speed value of the moving image 604 based on the direction and length of a displayed extendable cursor, depicted as the stretchable cursor 402. Then, the computing device 2202 can return to the second determine manipulation module 2404 (SP50).

In this respect, if a negative result is obtained in the second determine transverse drag module 2410 (SP53), this means that the touch manipulation is the tap. Then, the computing device 2202 can proceed to a second return moving image module 2414 (SP55), which returns the reproduction speed 602 of the moving image 604 to the initial value (forward direction, 1× speed), normally reproduces the moving image 604. Then, the computing device 2202 can return to the second determine manipulation module 2404 (SP50).

Further, on the other hand, if a positive result is obtained in the determine push module 2408 (SP52), this means that the touch screen 2214 is pressed. That is, the paste manipulation is performed. Then, the computing device 2202 can proceed to a second maintain reproduction module 2416 (SP56).

The second maintain reproduction module 2416 (SP56) maintains reproduction parameters, including reproduction direction and reproduction speed values, of the moving image 604 at this time. Then, the computing device 2202 can return to the second determine manipulation module 2404 (SP50).

Based on the manipulation input process routine 2402 (RT4), the computing device 2202 can reproduce the moving image 604 and maintain the reproduction speed 602, based on the manipulation input through the stretchable cursor 402 based on the drag 412 and the manipulation input through the pressing.

In the above-described configuration, the computing device 2202 of the electronic device system 2200 can display a transverse extendable cursor, depicted as the stretchable cursor 402, on the moving image reproduction screen 1202 of FIG. 12 based on the transverse drag, after the operation of the moving image reproduction application. Further, the computing device 2202 can reproduce the moving image 604 while setting the reproduction direction and reproduction speed value, based on the direction (leftward or rightward) and length of a displayed extendable cursor, depicted as the stretchable cursor 402.

In this way, the electronic device system 2200 can reproduce the moving image 604 by freely setting the reproduction direction and reproduction speed value of the moving image 604, using only the manipulation input through the stretchable cursor 402 based on the transverse drag.

Further, if the paste manipulation for pressing the screen is performed for a displayed extendable cursor, depicted as the stretchable cursor 402, the computing device 2202 can maintain the reproduction speed 602 (reproduction direction and reproduction speed value) right before the paste manipulation is performed after the paste manipulation, and continue the reproduction of the moving image 604. In this way, the electronic device system 2200 can continue to reproduce at the reproduction speed 602 set by the manipulation input through the stretchable cursor 402 through the paste manipulation after the finger is disengaged.

Based on such a configuration, the electronic device system 2200 can continue to reproduce at the reproduction speed 602 set by the manipulation input through the stretchable cursor 402 through the paste manipulation after the finger is disengaged. When the manipulation input with the drag 412 is performed, it can be possible to enhance manipulability compared with the case in the related art.

It has been discovered that the determine push module 2408 and the press-sensing module 208 of FIG. 2 improves input accuracy when the user performs pressing on the touch screen 2214 detected by the pressure sensor 2220.

It has also been discovered that the manipulation input process routine 2402 improves user experience with the second determine manipulation module 2404 determining the touch manipulation on the touch panel 2218, the determine push module 2408 determining the pressing on the touch screen 2214, and the second determine transverse drag module 2410 determining whether the touch manipulation is the transverse drag.

The physical transformation of movement of the stretchable cursor 402 having the ending portion 514 of FIG. 5 larger than the starting portion 510 of FIG. 5 and displayed by the display module 204 of FIG. 2 results in a visual display of the movement in the physical world, such as the drag 412 physically performed on the touch screen 104 of FIG. 1 by the user, based on the operation of the electronic device system 100 of FIG. 1 with process continuation mechanism. As the movement in the physical world occurs, the movement itself creates additional information that is converted back to the stretchable cursor 402 for the continued operation of the electronic device system 100 in the physical world.

Thus, it has been discovered that the electronic device system 100 of the present invention furnishes important and heretofore unknown and unavailable solutions, capabilities, and functional aspects for process continuation.

The electronic device system 100 describes the module functions or order as an example. The modules can be partitioned differently. Each of the modules can operate individually and independently of the other modules. For example, the first determine drag module 1808 of FIG. 18 can be integrated and combined with the first determine transverse drag module 1810 of FIG. 18 to form a single module.

Figure 25:
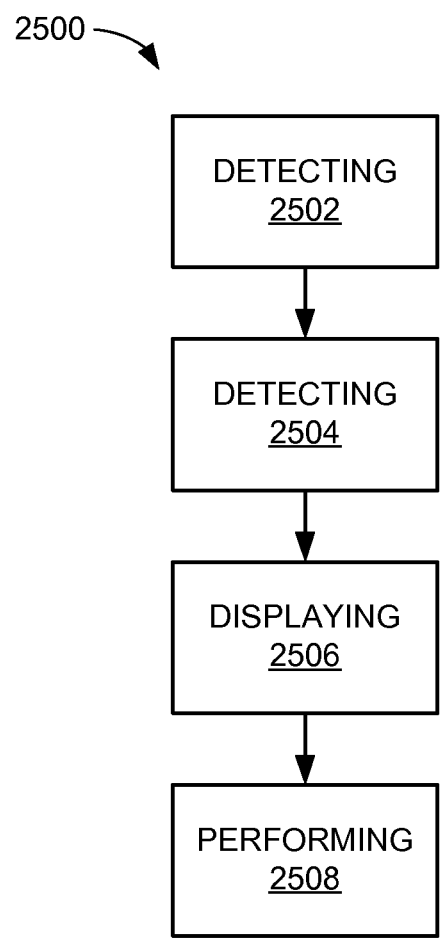
FIG. 25 is a flow chart of a method of operation of an electronic device system in a further embodiment of the present invention.

Referring now FIG. 25, therein is shown a flow chart of a method 2500 of operation of the electronic device system 100 in a further embodiment of the present invention. The method 2500 includes: detecting a drag performed on a touch screen, the drag having a starting point and an ending point in a block 2502; detecting a stretchable cursor extendable based on the drag, the stretchable cursor having a cursor length, a cursor direction, a starting portion, and an ending portion at the ending point and larger than the starting portion at the starting point in a block 2504; displaying the stretchable cursor on the touch screen in a block 2506; and performing a process routine based on the cursor length and the cursor direction, the process routine continued after the stretchable cursor is pasted with the drag performed on the touch screen in a block 2508.

In subsequent sections, other embodiments of the present invention will be described. The other embodiments are specific embodiments of the present invention in addition to the first and second embodiments described above.

In the current section, a first other embodiment is described. In the first embodiment as described above, the reproduction speed 602 of the moving image 604 or the adjustment speed of the sound volume can be controlled through the manipulation input through the stretchable cursor 402 in the moving image reproduction application.

However, the present invention is not limited thereto. Reproduction speeds of various contents or adjustment speeds of various parameters can be controlled through the manipulation input through the stretchable cursor 402 in other applications. For example, in the music reproduction application, the reproduction speed 602 of music (track) can be controlled through the manipulation input through the stretchable cursor 402.

In this case, for example, if a track is selected from the track list and then the transverse drag is performed on the screen, the computing device 302 can display the stretchable cursor 402 in the transverse direction 112 based on the drag 412. Further, the computing device 302 can set the reproduction direction of the track and the reproduction speed value based on the direction (leftward or rightward) of the stretchable cursor 402 and the length thereof.

Further, in the above-described first embodiment, the scroll speed 1002 of the track list can be controlled through the manipulation input through the stretchable cursor 402 in the music reproduction application.

The present invention is not limited thereto. The scroll speed 1002 of various display objects (image, text, list, or the like) can be controlled through the manipulation input through the stretchable cursor 402 in other applications. For example, in the Web browser, the scroll speed 1002 of a page image can be controlled through the manipulation input through the stretchable cursor 402.

In this case, for example, in a state where a page image is displayed on a Web browser screen, if a longitudinal drag, depicted as the drag 412, is performed on the screen, the computing device 302 can display a longitudinal extendable cursor, depicted as the stretchable cursor 402, based on the drag 412. Further, the computing device 302 can set the scroll direction of the page image and the scroll speed 1002 value thereof based on the direction (upward or downward) of the stretchable cursor 402 and the length thereof.

The scroll direction is not limited to a one-dimensional direction (the longitudinal direction 110 or the transverse direction 112). The scroll can be performed in a two-dimensional direction for a display object enlarged longitudinally and transversely in a display range thereof, such as a map, photograph, enlarged document, or the like.

Further, the present invention is not limited to the application. For example, control of the scroll speed 1002 of the display object, switching of a hierarchy, or control of the adjustment speed of a variety of parameters can be performed with a manipulation input through the stretchable cursor 402 in a variety of software such as an operating system (OS).

For example, in the OS, the scroll speed 1002 of a folder list or a file list can be controlled through the manipulation input through the stretchable cursor 402.

Further, the hierarchy can be switched from the file to the folder. In addition, for example, the adjustment speed of the resolution of the screen can be controlled. This is the case with the second embodiment.

In the current section, a second other embodiment is described. Further, in the above-described first embodiment, the present invention can be applied to the electronic device system 100 having the touch screen 104 as a manipulation device. However, the present invention is not limited to this case, and can be applied to an information processing apparatus having a variety of manipulation devices. Specifically, the present invention can be applied to an information processing apparatus having a manipulation device, which can perform the drag 412, such as a mouse, touch pad with buttons, joystick with buttons, analog stick capable of a press manipulation, camera, or the like.

Actually, in a case where the drag 412 is performed using a mouse, the computing device 302 can display a pointer, which moves based on the movement of the mouse on the screen, for example. Thereafter, a user can move the pointer to a desired position, and click a button of the mouse, to designate the starting point 404 of the drag 412. At this time, the computing device 302 can display the stretchable cursor 402. Further, the user can move the mouse while clicking the button to move the ending point 406 of the drag 412 (that is, the ending point 406 of the stretchable cursor 402), thereby performing the drag 412.

Further, in a case where the drag 412 is performed using the touch pad with buttons, the computing device 302 can display a pointer, which moves based on the touch manipulation on the touch pad on the screen, for example. Thereafter, a user can move the pointer in a desired position, and press a button of the touch pad, to designate the starting point 404 of the drag 412. At this time, the computing device 302 can display the stretchable cursor 402. Further, the user can move the touch position 504 while pressing the button to move the ending point 406 of the drag 412 (that is, the ending point 406 of the stretchable cursor 402), thereby performing the drag 412.

Further, in a case where the drag 412 is performed using the joystick, the computing device 302 can display a pointer, which moves based on the inclination of the joystick on the screen, for example. Then, a user can move the pointer in a desired position, and press the button of the joystick, to designate the starting point 404 of the drag 412. At this time, the computing device 302 can display the stretchable cursor 402. Further, the user can incline the joystick while pressing the button to move the ending point 406 of the drag 412 (that is, the ending point 406 of the stretchable cursor 402), thereby performing the drag 412.

In addition, in a case where the drag 412 is performed using the analog stick, the computing device 302 can display a pointer, which moves based on the inclination of the analog stick on the screen, for example. Then, a user can move the pointer in a desired position, and press the analog stick, to designate the starting point 404 of the drag 412. At this time, the computing device 302 can display the stretchable cursor 402. Further, the user can incline the analog stick while pressing the analog stick to move the ending point 406 of the drag 412 (that is, the ending point 406 of the stretchable cursor 402), thereby performing the drag 412.

In addition, in a case of the drag 412 being performed using the camera, the computing device 302 can recognize the movement of a finger based on an image photographed using the camera, and display a pointer, which moves according the movement of the finger on the screen, for example. Then, a user can move the pointer in a desired position, and perform a predetermine gesture (for example, gesture for drawing a circle by the finger), to designate the starting point 404 of the drag 412.

At this time, the computing device 302 can display the stretchable cursor 402. Further, the user can move the finger to move the ending point 406 of the drag 412 (that is, the ending point 406 of the stretchable cursor 402), thereby performing the drag 412. The above-described manipulations are examples, and can be any manipulations for designating the starting point 404 and the ending point 406 of the drag 412. Further, in the information processing apparatus having the manipulation device other than the touch screen 104, the manipulation device can be separately installed from the display device, or can be connected to an external display device.

In the current section, a third other embodiment is described. Further, in the above-described first embodiment, if a longitudinal drag, depicted as the drag 412, is performed on the screen in a state where the stretchable cursor 402 is displayed using the transverse drag on the screen, the computing device 302 can recognize it as the paste manipulation. That is, the computing device 302 can recognize the manipulation for bending the direction of the drag 412 from the transverse direction 112 to the longitudinal direction 110 at a right angle, as the paste manipulation.

The present invention is not limited thereto. When the ending point 406 of the drag 412 is not moved for a predetermined time or longer in a state where the stretchable cursor 402 is displayed by the transverse drag on the screen, this can be recognized as the paste manipulation. That is, a manipulation for fixing the touch position 504 without moving the touch position 504 for a predetermined time or longer can be used as the paste manipulation.

Further, the present invention is not limited thereto. In the case of a gesture manipulation in which the movement of the finger is a movement for pasting the ending point 406 portion of the stretchable cursor 402 on the screen, other various gesture manipulations can be used as the paste manipulation.

Further, on the other hand, in the above-described second embodiment, the pressing on the screen is detected by the pressure sensor 2220, and the computing device 302 can recognize it as the paste manipulation. That is, the computing device 302 can recognize the press manipulation on the screen as the paste manipulation.

The present invention is not limited thereto. The pressing of the screen can be detected by the touch panel 318 of the touch screen 104. Specifically, the touch panel 318 can be an electrostatic capacitance type, an area of a portion with which an object such as a finger is in contact (referred to as a contact area) can be detected.

After the transverse drag is performed on the screen using the touch panel 318, if the contact area of the finger, which is disposed in the ending point 406 of the drag 412, becomes a predetermined value or larger (for example, 1.1 times), it can be detected that the finger presses the screen. In this way, the pressure sensor 2220 can be omitted, and as a result, the configuration of the electronic device system 2200 can be simplified.

In the current section, a fourth other embodiment is described. Further, in the above-described first embodiment, when the adjustment speed of the sound volume or the scroll direction of the track list is controlled based on the direction and the cursor length 410 of the stretchable cursor 402, the starting position 506 (C1) of the stretchable cursor 402 can be moved.

The present invention is not limited thereto. When the reproduction speed 602 of the moving image 604 is controlled based on the direction and the cursor length 410 of the stretchable cursor 402, the starting position 506 (C1) of the stretchable cursor 402 can be moved.

Further, in the first and second embodiments, the reproduction speed 602 (reproduction direction and reproduction speed value) of the moving image 604 can be maintained based on the paste manipulation. The present invention is not limited thereto. The scroll speed 1002 (scroll direction and scroll speed value) of the display object can be maintained or the adjustment speed (adjustment direction and adjustment speed value) of the parameters can be maintained, based on the paste manipulation.

In the current section, a fifth other embodiment is described. Further, in the above-described first embodiment, until the starting position 506 (C1) of the stretchable cursor 402 reaches the first centerline 1502 (L1), the starting position 506 (C1) can be reversely moved to the ending position 508 (C2), and if it reaches the first centerline 1502 (L1), the position can be fixed.

The present invention is not limited thereto. The starting position 506 (C1) is not fixed even though the starting position 506 (C1) reaches the first centerline 1502 (L1), and the starting position 506 (C1) can be continuously moved in a reverse direction to the ending position 508 (C2) while the drag 412 is performed. This is the case with the second embodiment.

In the current section, a sixth other embodiment is described. Further, in the above-described first embodiment, if the stretchable cursor 402 steps over the first centerline 1502 (L1) and the direction of the drag 412 is reversed, the starting position 506 (C1) of the stretchable cursor 402 can be moved in a reverse direction to the ending position 508 (C2).

The present invention is not limited thereto. If the direction of the drag 412 is reversed without regard to whether the stretchable cursor 402 steps over the first centerline 1502 (L1), the starting position 506 (C1) of the stretchable cursor 402 can be moved in a reverse direction to the ending position 508 (C2).

Further, in addition to the contents of the fourth other embodiment, in this case, the starting position 506 (C1) cannot be fixed even though the starting position 506 (C1) reaches the first centerline 1502 (L1). This is the case with the second embodiment.

In the current section, a seventh other embodiment is described. Further, in the first and second embodiments, if the finger is disengaged after the paste manipulation is performed for the stretchable cursor 402, the stretchable cursor 402 can be reduced to a circular shape, and then can be deleted.

The present invention is not limited thereto. Even though the finger is disengaged after the paste manipulation is performed for the stretchable cursor 402, the stretchable cursor 402 can be continuously displayed as it is.

In this case, for example, if a portion other than the stretchable cursor 402 that is continuously displayed is tapped, the computing device 302 can return to the reproduction speed 602 to the initial value, to returning the moving image 604 to a normal reproduction. Further, if the stretchable cursor 402 that is continuously displayed is touched and the drag 412 is performed again, the computing device 302 can control the reproduction speed 602 while stretching or reducing the stretchable cursor 402 based on the drag 412.

In the current section, an eighth other embodiment is described. Further, in the first and second embodiments, the stretchable cursor 402 is displayed based on the drag 412. Here, the processing information indicating which process is currently performed based on the stretchable cursor 402 and the manipulation input through the stretchable cursor 402 can be displayed on the screen. For example, when the moving image 604 is reproduced at an arbitrary reproduction speed, depicted as the reproduction speed 602, based on the manipulation input through the stretchable cursor 402, the computing device 302 can display words, such as "fast-forward", "rewind", or the like, indicating the reproduction direction on the screen.

Further, the computing device 302 can display words, such as "2.0×", "−1.5×", or the like, directly indicating the reproduction direction and reproduction speed value, or patterns, such as ">>", "<<" or the like, indirectly indicating the reproduction direction and reproduction speed value. In this way, the computing device 302 can allow the user to recognize which process is currently performed based on the manipulation input through the stretchable cursor 402.

In the current section, a ninth other embodiment is described. Further, in the first embodiment, if the drag 412 is continuously performed in one direction for a predetermined time or longer, the computing device 302 can transit from a normal scroll mode to a stretchable scroll mode.

The present invention is not limited thereto. If the touch is continuously performed in arbitrary places on the screen for the predetermined time or longer (that is, if a long pressing is performed on the screen), the mode can transit to the stretchable scroll mode. Further, if the finger is disengaged, the mode can transit to the normal scroll mode again. That is, in this case, if the drag 412 is performed through the long pressing, the computing device 302 can control the scroll in the stretchable scroll mode. If the drag 412 is a normal drag (or flick), the computing device 302 can control the scroll in the normal scroll mode.

The above-described manipulation is an example, and the mode can be switched using different switching manipulations as long as they can switch the normal scroll mode and the stretchable switching mode.

In the current section, a tenth other embodiment is described. Further, in the first and second embodiments, the reproduction direction of the moving image 604 and the reproduction speed value can be controlled based on the direction and the cursor length 410 of the stretchable cursor 402.

The present invention is not limited thereto. The reproduction direction can be fixed and only the reproduction speed value of the moving image 604 can be controlled based on only the cursor length 410 without regard to the direction thereof.

Further, the reproduction speed value of the moving image 604 can be fixed and only the reproduction direction of the moving image 604 can be controlled based on only the direction of the stretchable cursor 402 without regard to the length thereof.

Further, only the scroll direction of the track list can be fixed and only the scroll speed value of the track list can be controlled based on only the cursor length 410 without regard to the direction thereof.

Further, only the scroll speed value of the track list can be fixed and only the scroll direction of the track list can be controlled based on only the direction of the stretchable cursor 402 without regard to the length thereof.

Further, the adjustment speed value of the sound volume can be fixed and only the adjustment direction of the sound volume can be controlled based on only the direction of the stretchable cursor 402 without regard to the length thereof.

In addition, the present invention is not limited to reproduction of contents, scroll of list, and adjustment of parameters. Other different processes can be performed by the manipulation input using the stretchable cursor 402.

In the current section, an eleventh other embodiment is described. Further, in the above-described first embodiment, the touch screen 104 including the display panel 316 and the touch panel 318 of an electrostatic capacitance type can be installed in the electronic device system 100.

The present invention is not limited thereto. Instead of the touch screen 104, a liquid crystal display having a touch panel function therein can be installed in the electronic device system 2200. This is the case with the second embodiment. In this case, the pressure sensor 2220 can be arranged in the liquid crystal display.

Further, instead of the display panel 316, other various displays, such as an electroluminescent (EL) display, or the like, can be used.

In the current section, a twelfth other embodiment is described. Further, in the above-described first and second embodiments, the shape of the stretchable cursor 402 can become gradually thick as directing to the side of the ending position 508 (C2) from the side of the starting position 506 (C1).

The present invention is not limited thereto. The shape of the stretchable cursor 402 can be other different shapes, as long as the stretchable cursor 402 connects the starting point 404 of the drag 412 to the ending point 406 thereof.

In the current section, a thirteenth other embodiment is described. Further, in the above-described first embodiment, the touch screen 104, which is the manipulation section and the display section, and the computing device 302, which is the control section, can be installed in the electronic device system 100, which is the information processing apparatus.

The present invention is not limited thereto. The respective functional sections (manipulation section, display section, and control section) of the electronic device system 100 can be configured by different types of hardware, as long as they have the same functions.

Further, in the above-described second embodiment, the pressure sensor 2220, which is the pressure detecting section, can be installed in the electronic device system 2200, which is the information processing apparatus.

The present invention is not limited thereto. The pressure detecting section of the electronic device system 2200 can be configured by different types of hardware, as long as they have the same functions.

In the current section, a fourteenth other embodiment is described. Further, in the above-described first embodiment, programs for executing a variety of processes can be written in the non-volatile memory 304 of the electronic device system 100.

The present invention is not limited thereto. A slot for a storing medium such as a memory card can be installed in the electronic device system 100, and the computing device 302 can read out and execute a program from the storing medium inserted in the slot. Further, the computing device 302 can install the program read out from the storing medium in the non-volatile memory 304. Further, the computing device 302 can download the program from a device on a network through the network interface 320 and can install it in the non-volatile memory 304. This is the case with the second embodiment.

In the current section, a fifteenth other embodiment is described. Further, the present invention is not limited to the above-described embodiments and other embodiments. That is, the present invention can have an application range including any embodiment combining some or all of the above-described embodiments and other embodiments or any embodiment obtained by selecting some thereof.

It should be understood by those skilled in the art that various modifications, combinations, sub-combinations and alterations can occur depending on design requirements and other factors insofar as they are within the scope of the appended claims or the equivalents thereof.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an electronic device system comprising:
   detecting a drag performed on a touch screen, the drag having a starting point and an ending point;
   detecting a stretchable cursor extendable based on the drag, the stretchable cursor having a cursor length, a cursor direction, a starting portion, and an ending portion at the ending point and with the stretchable cursor gradually thicker as directed from the starting portion at the starting point toward the ending portion at the ending point;
   displaying the stretchable cursor on the touch screen;
   performing a process routine of a manipulation input based on the cursor length and the cursor direction after the stretchable cursor is pasted with the drag performed on the touch screen with a reproduction speed set based on the cursor length, the manipulation input based on a pressure value exceeding a threshold value, the process routine continued to perform without performing the drag after the stretchable cursor is pasted; and
   changing the cursor direction based on a movement of the ending point of the drag to follow the drag.

2. The method as claimed in claim 1 wherein detecting the stretchable cursor includes detecting the stretchable cursor having the cursor direction from the starting point to the ending point.

3. The method as claimed in claim 1 further comprising determining whether the drag is performed in a transverse direction on the touch screen.

4. The method as claimed in claim 1 further comprising moving a starting position of the stretchable cursor in a reverse direction to the direction of an ending position of the stretchable cursor based on the starting position.

5. The method as claimed in claim 1 further comprising maintaining reproduction of a moving image when the touch screen is pressed.

6. A method of operation of an electronic device system comprising:
   detecting a drag performed on a touch screen, the drag having a starting point and an ending point;
   detecting a stretchable cursor extendable between the starting point and the ending point, the stretchable cursor having a cursor length, a cursor direction, a starting portion, and an ending portion at the ending point and with the stretchable cursor gradually thicker as directed from the starting portion at the starting point toward the ending portion at the ending point;
   displaying the stretchable cursor on the touch screen;
   performing a process routine of a manipulation input based on the cursor length and the cursor direction after the stretchable cursor is pasted with the drag performed on the touch screen with a reproduction speed set based on the cursor length, the manipulation input based on a pressure value exceeding a threshold value, the process routine continued to perform without performing the drag after the stretchable cursor is pasted; and
   changing the cursor direction based on a movement of the ending point of the drag to follow the drag.

7. The method as claimed in claim 6 wherein detecting the stretchable cursor includes detecting the stretchable cursor having the cursor direction from the starting point to the ending point, the stretchable cursor having an ending portion radius around the ending portion larger than a starting end radius around the starting portion.

8. The method as claimed in claim 6 further comprising:
   determining whether the drag is performed in a transverse direction on the touch screen; and
   setting reproduction of a moving image based on the cursor direction and the cursor length when the drag is performed in the transverse direction.

9. The method as claimed in claim 6 further comprising moving a starting position of the stretchable cursor in a reverse direction to the direction of an ending position of the stretchable cursor when the starting position reaches a first centerline on the touch screen.

10. The method as claimed in claim 6 further comprising maintaining reproduction direction and speed values of a moving image when the touch screen is pressed.

11. An electronic device system comprising:
    a manipulation module for detecting a drag performed on a touch screen, the drag having a starting point and an ending point, and for changing the cursor direction based on a movement of the ending point of the dray to follow the drag;
    a control module, coupled to the manipulation module, for detecting a stretchable cursor extendable based on the drag, the stretchable cursor having a cursor length, a cursor direction, a starting portion, and an ending portion at the ending point and with the stretchable cursor gradually thicker as directed from the starting portion at the starting point toward the ending portion at the ending point;
    a display module, coupled to the control module, for displaying the stretchable cursor on the touch screen; and
    a first set reproduction module, coupled to the display module, for performing a process routine of a manipulation input based on the cursor length and the cursor direction after the stretchable cursor is pasted with the drag performed on the touch screen with a reproduction speed adjusted set on the cursor length, the manipulation input based on a pressure value exceeding a threshold value, the process routine continued to perform without performing the drag after the stretchable cursor is pasted.

12. The system as claimed in claim 11 wherein the control module is for detecting the stretchable cursor having the cursor direction from the starting point to the ending point.

13. The system as claimed in claim 11 further comprising a first determine drag module, coupled to the control module, for determining whether the drag is performed in a transverse direction on the touch screen.

14. The system as claimed in claim 11 further comprising a first move starting point module, coupled to the control module, for moving a starting position of the stretchable cursor in a reverse direction to the direction of an ending position of the stretchable cursor based on the starting position.

15. The system as claimed in claim 11 further comprising a second maintain reproduction module, coupled to the control module, for maintaining reproduction of a moving image when the touch screen is pressed.

16. The system as claimed in claim 11 wherein the control module is for detecting the stretchable cursor extendable between the starting point and the ending point.

17. The system as claimed in claim 16 wherein the control module is for detecting the stretchable cursor having the cursor direction from the starting point to the ending point, the stretchable cursor having an ending portion radius around the ending portion larger than a starting end radius around the starting portion.

18. The system as claimed in claim 16 further comprising:
a first determine drag module, coupled to the control module, for determining whether the drag is performed in a transverse direction on the touch screen; and
wherein:
the first set reproduction module is for setting reproduction of a moving image based on the cursor direction and the cursor length when the drag is performed in the transverse direction.

19. The system as claimed in claim 16 further comprising a first move starting point module, coupled to the control module, for moving a starting position of the stretchable cursor in a reverse direction to the direction of an ending position of the stretchable cursor when the starting position reaches a first centerline on the touch screen.

20. The system as claimed in claim 16 further comprising a second maintain reproduction module, coupled to the control module, for maintaining reproduction direction and speed values of a moving image when the touch screen is pressed.

* * * * *